United States Patent

Mori et al.

[11] Patent Number: 5,935,460
[45] Date of Patent: Aug. 10, 1999

[54] METHOD OF PERFORMING HIGH-EFFICIENCY MACHINING BY HIGH-DENSITY RADICAL REACTION USING A ROTATING ELECTRODE, DEVICE FOR PERFORMING THE METHOD AND THE ROTATING ELECTRODE USED THEREFOR

[75] Inventors: Yuzo Mori, Katano; Toshio Ishikawa, Nara, both of Japan

[73] Assignee: Japan Science and Technology Corporation, Kawaguchi, Japan

[21] Appl. No.: 08/793,293

[22] PCT Filed: Jan. 15, 1997

[86] PCT No.: PCT/SE97/00047

§ 371 Date: Dec. 5, 1997

§ 102(e) Date: Dec. 5, 1997

[87] PCT Pub. No.: WO97/02917

PCT Pub. Date: Jan. 30, 1997

[30] Foreign Application Priority Data

Jul. 12, 1995 [JP] Japan .................................. 7-176476

[51] Int. Cl.⁶ .................................................. B23K 10/00
[52] U.S. Cl. .............................. 219/121.59; 219/121.52; 219/121.43; 219/121.39; 219/121.51; 219/69.1; 83/16
[58] Field of Search ......................... 219/121.52, 121.39, 219/121.44, 121.59, 121.48, 69.17, 69.11, 68, 121.51; 83/15, 16, 170

[56] References Cited

U.S. PATENT DOCUMENTS 3,663,787  5/1972  Haswell, III et al. ................ 219/69 V
4,641,007  2/1987  Lach ..................................... 219/69 M
4,691,090  9/1987  Garlanov et al. .................... 219/121 A
5,279,623  1/1994  Wantabe et al. ....................... 29/25.03

FOREIGN PATENT DOCUMENTS 0349827   3/1991  Japan .
6344227  12/1994  Japan .

Primary Examiner—Mark Paschall
Attorney, Agent, or Firm—Armstrong, Westerman, Hattori, McLeland & Naughton

[57] ABSTRACT

There are provided a method for performing high-efficiency machining by high-density radical reaction using a rotating electrode, in which a large amount of the reaction gas is supplied to a machining gas between a machining electrode and a workpiece under control, and the limit value of a making power is elevated so that the density of neutral radicals is increased to remarkably improve the machining rate 10 to 100 times as large as the conventional machining rate, and the prevention of arc discharge and the thermal stabilization are made. An endless machining electrode and the workpiece are disposed in gas atmosphere containing a reactive gas and an inactive gas with a machining gap therebetween, and a high-frequency power is supplied to the machining electrode, and the machining electrode is rotated at a high speed to move the surface of the machining electrode with respect to the machining progress portion at a high speed and to catch the gas by the surface of the machining electrode, thereby forming a gas flow which is transverse to the machining gap, and a volatile material generated by the radical reaction of the neutral radicals produced in plasma generated in the machining gap with atoms or molecules which constitute the machining progress portion of the workpiece is gasified and removed to progress machining.

20 Claims, 25 Drawing Sheets

(a)

(c)

(b)

(a)

(c)

(b)

(a)

(b)

(c)

(d)

(a)

(b)

(c)

(d)

(e)

(a)

(b)

(c)

(d)

(e)

(a)

(b)

(c)

(d)

(e)

(a)

(b)

(a)

(b)

5,935,460

METHOD OF PERFORMING HIGH-EFFICIENCY MACHINING BY HIGH-DENSITY RADICAL REACTION USING A ROTATING ELECTRODE, DEVICE FOR PERFORMING THE METHOD AND THE ROTATING ELECTRODE USED THEREFOR

BACKGROUND OF THE INVENTION

1. Field of the Invention

The present invention relates to a method of performing high-efficiency machining by high-density radical reaction using a rotating electrode and a device for performing the method, and more particularly to a method of performing high-efficiency machining by high-density radical reaction using a rotating electrode, a device for performing the method and a rotating electrode used therefor, which is capable of machining with a high accuracy and a high efficiency without introducing a defect or a heat-affected layer into a semiconductor such as silicon monocrystal, a conductor, or an insulator such as glass or ceramics.

2. Description of the Related Art

Up to now, in cutting silicon monocrystal, there has been used, for example, a dicing machining method by a diamond wheel. Since this machining principle uses brittle destroy due to a fine crack, the machined surface is not crystallographically controlled, and a deep damage is always given to the machined surface to the degree of the thickness of the finished machining. In the case of manufacturing a semiconductor device using a wafer thus cut, a yield is poor, and its electrical performance is deteriorated. Also, the machining principle is one factor for measuring the limit of the integrated degree. This fact is applicable to machining of all of a variety of functional materials.

Under the circumstances, as disclosed in Japanese Patent Unexamined Publication No. Hei 1-125829 (U.S. Pat. No. 4,960,495), there has been proposed a non-strain precision machining method (plasma CVM method) in which the neutral radical of a reactive gas caused by high-density plasma generated by an electrode to which a high frequency is applied is supplied to a machined surface of a workpiece, and volatile material generated by radical reaction of the neutral radical with atoms or molecules constituting the machined surface is gasified so as to be removed, thereby being capable of performing machining with a high accuracy without introducing a defect or a heat-affected layer into a semiconductor such as silicon monocrystal, a conductor, or an insulator such as glass or ceramics.

In this specification, "CVM" is an abbreviation of "chemical vaporization machining".

In other words, the CVM is a method in which a workpiece and an electrode are disposed in an atmospheric gas containing a reaction gas, and a high-frequency voltage is applied between the workpiece and the electrode, to thereby produce the neutral radical based on the reaction gas in the vicinity of the electrode. In this situation, in the case where the machining electrode is formed of a wire electrode, the workpiece can be subjected to cutting machining or grooving machining; in the case where the machining electrode is formed of a planer electrode, the workpiece can be subjected to smoothing machining or specular machining; and in the case where the machining electrode is formed of a complicatedly shaped electrode, the workpiece can be subjected to transfer machining by which the shaped of the electrode is transferred to the workpiece.

In the case of cutting the workpiece, a structure using the wire electrode is effective. However, in the cutting machining using a normal wire electrode, the reaction gas cannot be sufficiently supplied into the cut groove which is formed during its process, and an electric power supplied to the electrode is low. Also, in the specular machining using the planar electrode having a large-area smooth surface, the reaction gas cannot be sufficiently supplied to the center of a machining gap, to thereby lower the density of the neutral radical on its portion. As a result, in case of the cutting machining, the machining speed is lowered with the progress of the machining, and in case of the specular machining, a difference in machining rate between the peripheral portion and the central portion of the electrode causes the nonuniformity of the amount of machining.

For that reason, the present inventor(s) have proposed a cutting method using a flat gas supply nozzle which is capable of being inserted into the machining groove (Japanese Patent Unexamined Publication No. Hei 1-162523), a machining method in which a gas supply hole is defined in a support body that holds the machining electrode (Japanese Patent Unexamined Publication No. Hei 4-337635, Japanese Patent Unexamined Publication No. Hei 5-96500, Japanese Patent Unexamined Publication No. Hei 6-168924), a machining method in which a gas supply means is provided in a machining electrode per se, and a reaction gas is forcedly supplied to a machining gap between the machining electrode and the workpiece (Japanese Patent Unexamined Publication No. Hei 4-246184, Japanese Patent Unexamined Publication No. Hei 6-85059), to thereby achieve a maximum machining rate of several tens $\mu$m/m. This machining rate remarkably exceeds the common sense of the conventional plasma etching. However, it is insufficient for cut-machining the workpiece which is high in thickness and polish-machining a large area of the workpiece.

Since the machining rate has a close connection with the density of the neutral radical in the vicinity of the machining progress portion of the workpiece, that is, the density of the reaction gas and the making power for generating the neutral radical, it is presumed that the causes by which the machining rate could not be remarkably improved even in any conventional methods are that the supply of a reaction gas and the exhaust of used gas are insufficient, and that the limit value of the making power is low. It is presumed that the reason that the supply of the reaction gas and the exhaust of the used gas are insufficient in the plasma CVM of the present invention is that since the pressure of the gas atmosphere is very high to the degree of 1 atmospheric pressure or higher, and the machining gap is very narrow to the degree of 10 to 200 $\mu$m, the viscous resistance of gas is very low. Also, the cause that the limit value of the making power is low is that the concentrated portion of the electric field of the machining electrode is heated, thereby being thermally damaged. For example, in case of conducting the cut-machining using the wire electrode under the gas atmosphere of 1 atmospheric pressure, the limit concentration of the reaction gas (SF$_6$) is 1 to several %, and the limit making power is about 40 W/cm, by which the machining rate achieved is 20 to 30 $\mu$m/sec. Moreover, in the case of ejecting the reaction gas from a gas supply nozzle or a gas supply hole, the distribution of density of the reaction gas is generated with the defect that the amount of machining is partially different, thereby not obtaining really uniformly machined surface.

SUMMARY OF THE INVENTION

The present invention has been made in view of the above circumstances, and therefore an object of the present invention is to provide a method of performing high-efficiency machining by high-density radical reaction using a rotating electrode and a device for performing the method, in which mechanisms for supplying and exhausting a reaction gas to a machining gap formed between a machining electrode and a processing progress portion of a workpiece are fundamentally reconsidered in such a manner that a large amount of the reaction gas is supplied to the machining gap under control, and the limit value of the making power to the machining electrode is elevated so that the density of neutral radicals in the vicinity of the machining progress portion is increased, thereby being capable of remarkably improving the machining rate to 10 to 100 times, preventing arc discharge, and making thermal stabilization.

On the other hand, with the rotation of the machining electrode, the limit value of the high-frequency power supplied to the machining electrode (rotating electrode) is increased, to thereby put plasma in instability and with such an additional problem that the plasma temperature is elevated. In other words, because the rotating electrode is made of metal, ions that are charge particles in plasma collide with the surface of metal to discharge secondary electrons, whereby the density of electrons in plasma becomes more excessive than the density of ions. This makes it very difficult to maintain an electrically neutral state. As the density of electrons in plasma becomes excessive, it is shifted to, particularly, arc discharge which is a local insulation destroy in a high-pressure plasma, thereby being liable to come to an uncontrollable state. Also, the temperature of plasma is elevated, thereby leading to a thermal damage on the surface to be machined.

In order to solve the above problem, the present invention has been achieved by the provision of a rotating electrode using a high-efficiency machining method due to high-density radical reaction, which prevents the secondary electrons from being discharged from the surface of the metal rotating electrode to steadily maintain plasma which is electrically neutral and low in temperature, thereby being capable of realizing the stabilization of the machining characteristics, and realizing an increase in machining rate with a remarkably increased limit value of the making power.

In order to solve the above problem, the present invention has been achieved by the provision of a method of performing high-efficiency machining by high-density radical reaction using a rotating electrode, in which an endless machining electrode and a workpiece are disposed in gas atmosphere containing a reactive gas and an inactive gas, the machining electrode is rotated at a high speed while maintaining a machining gap between said machining electrode and the machining progress portion of the workpiece, to move the surface of said machining electrode with respect to the machining progress portion at a high speed and to catch the gas by the surface of the machining electrode, thereby forming a gas flow which is transverse to said machining gap, and a high-frequency voltage is applied to the machining electrode to generate plasma in the machining gap, neutral radicals are generated on the basis of the reactive gas, a volatile material generated by the radical reaction of said neutral radicals with atoms or molecules which constitute the machining progress portion of the workpiece is gasified and removed, and the machining electrode and the workpiece are moved relatively to progress machining.

In this method, it is preferable that said machining electrode is rotationally symmetrical with respect to a rotating axis, and said machining electrode is rotated about the rotating axis at a high speed to catch the gas by the surface of the machining electrode and to supply the gas to the machining gap.

Also, it is preferable that fine irregularities or grooves are formed on the surface of said machining electrode to facilitate the catching of the gas.

Further, it is preferable depending on the material of the workpiece that an auxiliary electrode is disposed on the back surface or the side surface of the workpiece so as to face with said machining electrode in such a manner that the machining progress portion of said workpiece is interposed between said machining electrode and said auxiliary electrode, and a high-frequency voltage is applied between said machining electrode and said auxiliary electrode.

On the other hand, in order to machine the workpiece by the above-mentioned machining method, there is provided a high-efficiency machining device, which comprises: a chamber inside of which the endless machining electrode and the workpiece are disposed, for sealingly enclosing or circulating an atmospheric gas containing a reactive gas and an inactive gas therein; a high-frequency power supply for supplying a high-frequency power to a machining electrode; a matching device for matching said high-frequency power and an impedance of a load; a feed drive mechanism for maintaining a machining gap between said endless machining electrode and the machining progress portion of the workpiece and for relatively moving the machining electrode and the workpiece; a rotation drive mechanism for rotating said machining electrode at a high speed to form a gas flow which is transverse to said machining gap by moving said machining electrode with respect to the machining progress portion at a high speed and by catching the gas by the surface of the machining electrode; wherein a high-frequency voltage is applied to the machining electrode to generate plasma in the machining gap, neutral radicals are generated on the basis of the reactive gas, a volatile material generated by the radical reaction of said neutral radicals with atoms or molecules which constitute the machining progress portion of the workpiece is gasified and removed, and the machining electrode and the workpiece are moved relatively to progress machining.

Similarly, in this machining device, it is preferable that said machining electrode is rotationally symmetrical with respect to a rotating axis, and said machining electrode is rotated about the rotating axis at a high speed to catch the gas by the surface of the machining electrode and to supply the gas to the machining gap; and that an auxiliary electrode is disposed on the back surface or the side surface of the workpiece so as to face with said machining electrode in such a manner that the machining progress portion of said workpiece is interposed between said machining electrode and said auxiliary electrode, and a high-frequency voltage is applied between said machining electrode and said auxiliary electrode.

Also, it is preferable that said machining electrode is shaped in the form of a flat disc, and its outer peripheral portion forms an electric field concentrated portion to cut the workpiece; said machining electrode is in the form of a hollow flat ring, and its inner peripheral portion forms an electric field concentrated portion to cut the workpiece; said machining electrode is in the form of a thick disc, a hollow thick disc, a column or a cylinder, and a bus is provided in parallel with the rotating axis on its outer peripheral surface or its inner peripheral surface, to polish the workpiece; said machining electrode is in the form of a sphere, a thick disc having an arc swelling on its outer peripheral portion, or a flat disc, and its outer peripheral portion forms an electric field concentrated portion, a relative position of the machining electrode and the workpiece is moved under numerical control, and the mean residence time of the electric field concentrated portion with respect to the machining progress portion of the workpiece is determined in length in accordance with the amount of machining at the machining progress portion to machine the workpiece in an arbitrary shape; or said machining electrode is in the form of a cylinder or a column from the outer periphery of which a single or a plurality of ring-shaped blades are projected at appropriate intervals, and the outer peripheral portion of the blade forms an electric field concentrated portion to dice a plate-shaped workpiece or to groove the surface of the workpiece.

Furthermore, it is preferable that, on the side surface of said machining electrode which is in the form of the flat disc or the hollow flat ring, fine irregularities spiral recess grooves, or ribs are formed; on the outer peripheral portion or the inner peripheral portion of said machining electrode which is in the form of the flat disc or the hollow flat ring, gear-shaped irregularities are formed at each predetermined interval; on the surface of said machining electrode which is in the form of the thick disc, the hollow thick disc, the column or the cylinder, having the bus which is in parallel with the rotating axis on the outer peripheral surface or the inner peripheral surface, fine irregularities, continuous screw-shaped recess grooves or ribs having an inclined angle are formed; or on the surface of said machining electrode which is in the form of the sphere, the thick disc having the arc swelling on its outer peripheral portion, or the flat disc, fine irregularities, continuous screw-shaped recess grooves or ribs having an inclined angle are formed.

According to the high-efficiency machining method by the high-density radical reaction using the rotating electrode thus structured in accordance with the present invention, and the device for performing the method, the machining electrode and the workpiece are disposed in the gas atmosphere containing the reactive gas with the predetermined machining gap formed therebetween, the high-frequency voltage is applied to said machining electrode, to thereby generate plasma in the vicinity of its surface, the reactive gas is excited within a plasma region to produce neutral radical rich in reactivity, the volatile material generated by the radical reaction of said neutral radical with atoms or molecules which constitute the workpiece is gasified and removed, and the machining electrode and the workpiece are relatively moved while the predetermined machining gap is maintained to progress machining. It should be noted that the reason that plasma is generated and maintained in the machining gap between the machining electrode and the machining progress portion of the workpiece is because of the electric field concentration due to the difference in dielectric constant therebetween.

A significant difference between the present invention and the prior art resides in that the machining electrode is rotated at a high speed. The effects expectable by this feature are: 1) a remarkable improvement in machining rate due to the high-speed supply of the reactive gas and the high-speed exhaust of the used gas; 2) a remarkable improvement in gas use efficiency and machining accuracy due to high-accuracy positioning of the surface of the rotating electrode and high-accuracy controlling of the gap; and 3) a remarkable improvement in machining efficiency due to making a large power on the basis of a sufficient cooling effect on the machining electrode. Hereinafter, a description will be given of the above effects from the physical viewpoint.

The effect 1) is easily predictable from the viewpoint of hydrodynamics. In other words, what is treated by the hydrodynamics is material having viscosity, one of which is gas. In the case of making gas flow, the moving rate of the gas is 0 on a fixed boundary. As a result, the boundary surface becomes an obstacle to the flowing of the gas because of the viscosity. Therefore, in the case of making the gas flow in the gap defined between the fixed workpiece and machining electrode, both of them become obstacles. Consequently, the flow rate of the gas on the surface of the machining electrode which rotates at a high speed becomes equal to that of the surface of the electrode, resulting in a motive power that accelerates the gas, far from the obstacle. As described above, as the machining electrode rotates at a high speed, the supply of the gas as well as the exhaust of the used gas is more facilitated, thereby being capable of supplying a large amount of neutral radical.

The effect 2) can be explained from the viewpoint of hydrodynamics as in the effect 1). In the case of making the gas flow in the fixed boundary, the flow of gas depends on boundary conditions. Therefore, if the flow of gas is intended to be controlled, the spatial position and speed of the boundary surface may be controlled using the rotating electrode. It is needless to say that as the machining gas approaches a gap from which plasma can be generated viewed from the mean free path, the use efficiency of radical is more enhanced from the viewpoint of the molecular movement, and the machining accuracy is also more improved.

The effect 3) means a sufficient power that suits the sufficient supply of gas as a condition required for improving the machining efficiency in this machining method. Up to now, what disturbs making of the large power was a damage on the electrode based on a thermal factor. Therefore, most of the electrode is cooled by using the high-speed rotating electrode since only a part of the electrode is exposed to plasma. Hence, even though a large power is made, the machining with high efficiency and high accuracy is enabled without the electrode being damaged.

As described above, the use of the rotating electrode enables the machining efficiency to be enhanced 10 to 100 times as high as that in the conventional method, and the machining accuracy, the dimensional accuracy and the surface roughness can be extraordinarily improved. These facts were logically predicted and experimentally proved.

Also, with said machining electrode being rotationally symmetrical with respect to the rotating axis, said machining electrode can be more stably rotated about the rotating axis at a high speed. As a result, the gas is caught by the surface of said machining electrode and supplied to the machining gap, and the gas exhaust action is increased. Also, the spatial position on the surface of the machining electrode is determined with a high accuracy, and the setting of the machining gap is stabilized, to thereby enable machining with a high accuracy.

Then, with the fine irregularities or the grooves being formed on the surface of said machining electrode, the viscous resistance of the boundary layer between the surface of the machining electrode and the gas is increased, and the puma action of the concave or convex portion is increased with the results that the catching of the gas by the machining electrode is facilitated, the flow of a gas which is transverse to the machining gap can be efficiently generated, and a large amount of the reactive gas and inactive gas which form a neutral radical source can be supplied to an object space and also exhausted therefrom.

Also, with the irregularities or the grooves being formed on the outer peripheral portion or the inner peripheral portion of the machining electrode that forms the machining gap, an electric field is concentrated on the top portion of the convex portion formed at each predetermined interval to locally generate plasma, and the plasma can be intermittently generated and extinguished by making the machining electrode rotate at a high speed, thereby being capable of preventing the plasma from being shifted to arc discharge. In other words, in the case where it can be assumed that the machining electrode and the workpiece are fixed, the emission of thermoelectron from the machining electrode and the collision of ions to the machining electrode are acceleratively repeatedly generated and shifted to arc discharge. However, with the plasma being intermittently generated and extinguished, even though a large power is applied, the shifting to arc discharge can be prevented.

Also, with the continuous screw-shaped recess grooves or ribs having the inclined angle being formed on the outer periphery or the inner periphery of the machining electrode which is in the form of the thick disc, the hollow thick disc, the column or the cylinder, plasma can be prevented from being shifted to arc discharge, and the machining progress portion of the workpiece is scanned in the axial direction. In other words, since the plasma is intermittently generated and extinguished viewed from one point of the machining progress portion, the machining progress portion can be prevented from being excessively heated.

Further, since the auxiliary electrode is disposed on the back surface or the side surface of the workpiece so as to face with said machining electrode in such a manner that the machining progress portion of the workpiece is interposed between the machining electrode and the auxiliary electrode, and a high-frequency voltage is then applied between said machining electrode and said auxiliary electrode, the plasma can be further concentratedly generated by only a region of the machining gap even though the workpiece is made of insulator or semiconductor, thereby being capable of increasing the density of neutral radical in that region. It is needless to say that it is effective in a case where the workpiece is made of conductor.

Further, in order to solve the above problem, the present invention has been achieved by the provision of a rotating electrode for use in the high-efficiency machining method due to the high-density radical reaction, in which while a machining gap is maintained between a machining electrode and the machining progress portion of a workpiece which are disposed in gas atmosphere containing a reactive gas and an inactive gas, the machining electrode is rotated at a high speed so that the gas is caught by the surface of said rotating electrode, to thereby form the flow of gas which is transverse to said machining gap, a high-frequency voltage is applied to the rotating electrode to generate plasma in the machining gap so that neutral radicals are generated on the basis of the reactive gas, a volatile material generated by the radical reaction of said neutral radical with atoms or molecules which constitute the machining progress portion of the workpiece is gasified and removed, and the machining electrode and the workpiece are moved relatively to progress machining, wherein an insulator coat high in corrosion resistance to the neutral radical is formed on at least a surface corresponding to the plasma generation region.

In this case, with the insulator coat being formed on the surface of the rotating electrode, even though ions in plasma collide with the surface of the rotating electrode, since the insulator coat prevents the secondary electrons from being emitted, the electrically neutral state is maintained with the result that low-temperature plasma can be stably maintained.

Also, it is preferable that said insulator coat is formed of a ceramics coat or a tetrafluoro ethylene resin coat, and also said rotating electrode is made of aluminum, and said insulator coat is formed of an alumina coat which is formed through alumite processing.

The above and other objects and features of the present invention will be more apparent from the following description taken in conjunction with the accompanying drawings.

BRIEF DESCRIPTION OF THE DRAWINGS

FIGS. 26A to 26D are diagrams showing embodiments of a flat disc-shaped machining electrode used in a cutting machining device, in which FIG. 26A shows an example where the surface of the machining electrode is smooth, FIG. 26B shows an example where fine irregularities are formed on the side surface of the machining electrode, FIG. 26C shows an example where spiral recess grooves are formed on the side surface of the machining electrode, and FIG. 26D shows an example where gear-shaped irregularities are formed on the outer peripheral portion of the machining electrode;

FIGS. 27A to 27D are diagrams showing embodiments of a hollow flat ring-shaped machining electrode used in a cutting machining device for a large-diameter workpiece, in which FIG. 27A shows an example where the surface of the machining electrode is smooth, FIG. 27B shows an example where fine irregularities are formed on the side surface of the machining electrode, FIG. 27C shows an example where spiral recess grooves are formed on the side surface of the machining electrode, and FIG. 27D shows an example where gear-shaped irregularities are formed on the inner peripheral portion of the machining electrode;

FIGS. 28A to 28E are diagrams showing embodiments of a columnar machining electrode used in a polishing machining device, in which FIG. 28A shows an example where the outer peripheral surface of the machining electrode is smooth, FIG. 28B shows an example where fine irregularities are formed on the outer peripheral surface of the machining electrode, FIG. 28C shows an example where a screw-shaped recess groove is formed on the outer peripheral surface of the machining electrode, FIG. 28D shows an example where a screw-shaped recess groove is formed on the outer peripheral surface of the machining electrode, and FIG. 28E shows an example where a screw-shaped recess groove is coated with an alumina layer;

FIGS. 29A to 29E are diagrams showing embodiments of a spherical machining electrode used in a numerically-controlled machining device for an arbitrary shape, in which FIG. 29A shows an example where the spherical surface of the machining electrode is smooth, FIG. 29B shows an example where fine irregularities are formed on the spherical surface of the machining electrode, FIG. 29C shows an example where a screw-shaped recess groove is formed on the spherical surface of the machining electrode, FIG. 29D shows an example where a screw-shaped recess groove is formed on the spherical surface of the machining electrode, and FIG. 29E shows an example where a screw-shaped recess groove is coated with an alumina layer;

FIGS. 30A to 30E are diagrams showing embodiments of a thick disc-shaped machining electrode having an arc swelling on its outer peripheral surface used in a numerically-controlled machining electrode, in which FIG. 30A shows an example where the outer peripheral surface of the machining electrode is smooth, FIG. 30B shows an example where fine irregularities are formed on the outer peripheral surface of the machining electrode, FIG. 30C shows an example where a screw-shaped recess groove is formed on the outer peripheral surface of the machining electrode, FIG. 30D shows an example where a screw-shaped recess groove is formed on the outer peripheral surface of the machining electrode, and FIG. 30E shows an example where a screw-shaped recess groove is coated with an alumina layer;

FIGS. 32A and 32B are diagrams showing a spherical rotating electrode (machining electrode) where an insulator high in corrosion resistance to neutral radicals is formed, in which FIG. 32A shows an entire perspective view of the rotating electrode, and FIG. 32B shows a cross-sectional view of the rotating electrode; and FIGS. 33A and 33B are diagrams showing a columnar rotating electrode (machining electrode) where an insulator high in corrosion resistance to neutral radicals is formed, in which FIG. 33A shows an entire perspective view of the rotating electrode, and FIG. 33B shows a cross-sectional view of the rotating electrode.

DETAILED DESCRIPTION OF THE PREFERRED EMBODIMENTS

Figure 1:
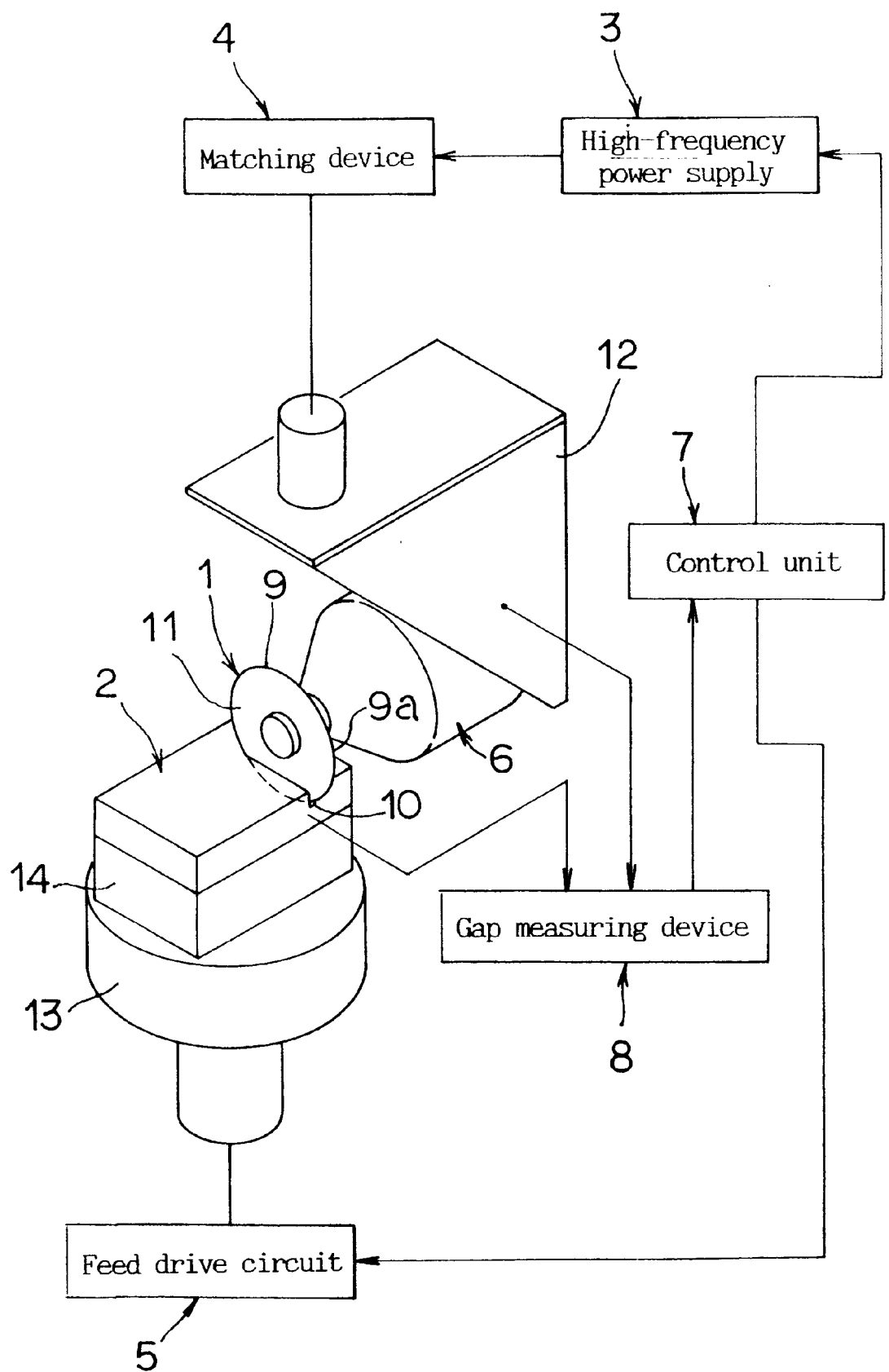
FIG. 1 is a schematic view explanatorily showing a cutting machining device in accordance with a first embodiment of the present invention.

The present invention has been made to enable cutting machining, polishing machining, numerically-controlled machining for an arbitrary shape, and dicing machining, as well as shape-transfer machining and free-curve cutting machining, to be conducted on a workpiece in accordance with the shape of the machining electrode, in particular, the shape of an electric field concentrated portion which contributes to direct machining, on the basis of a principle in which activated radicals (free radicals) rich in reactivity are generated in the vicinity of the machining progress portion of the workpiece, produced volatile material is gasified and removed using the radical reaction (free radical reaction) of the neutral radicals and atoms and molecules which form the workpiece, and a machining electrode and the workpiece are relatively moved to progress machining. It should be noted that the radicals in this specification means a concept in the plasma physical field (plasma etching, plasma CVD, etc.), that is, a broad concept including excited radicals in addition to radicals having unpaired electrons.

As a method of generating radicals, up to now, plasma which can be readily produced through discharge with the degree of vacuum being about 1 Torr or less ($10^{-3}$ to 1 Torr) has been used to conduct plasma dry etching. In the plasma dry etching, there arises no serious problem of a machining rate because its purpose is to remove only a surface layer portion of the workpiece. However, in the machining at which the present invention is aimed, since the machining rate is very important, the above-mentioned low-density plasma low in the density of the neutral radicals is not available to the invention. For example, assuming that a silicon wafer of 5 inches (about 127 mm in diameter) is cut, since 21 hours are required for machining when the machining rate is 100 $\mu$m/min, and 2.1 hours are required for machining when the machining rate is 1 mm/min, the machining rate of at least several hundreds $\mu$m/min or more is required in the cutting machining used industrially.

Since the machining rate largely depends on the kind of the neutral radicals, that is, the kind of a reactive gas, the kind of an inactive gas that dilutes the reactive gas and the material of the workpiece, it is necessary to select the optimum active gas and inactive gas depending on the workpiece. The reactive gas is excited in plasma which is generated by the making of a high-frequency power to produce the neutral radicals. In more detail, the machining electrode and the workpiece are disposed with a predetermined machining gap therebetween in a gas atmosphere of 1 to 10 atmospheric pressure, more preferably 1 atmospheric pressure or higher, and a high-frequency voltage is applied to the machining electrode to generate plasma. Then, the neutral radicals are produced on the basis of the reactive gas in plasma. The efficiency of producing the neutral radicals on the basis of the reactive gas in plasma also depends on the kind of the inactive gas that forms plasma. For example, in the case where the workpiece is made of silicon monocrystal or quartz glass, a proper reactive gas is $SF_6$, and a proper inactive gas is He. Other reactive gases include a fluorine gas of $CF_4$ and the like, and a chroline gas of $Cl_2$, $CCl_4$, $PCl_5$ and the like. Other inactive gases include N, Ar and the like. Those gases may be used as only one kind of gas or mixed gases.

Hence, provided that the kinds of optimum reactive gas and inactive gas are selected in accordance with the material of the workpiece, it is important as a real problem that how a large amount of reactive gas is efficiently supplied to and exhausted from the machining region, and that how an energy is efficiently given to the reactive gas.

Also, in the case where the machining rate is maintained constant, since the amount of machining (depth) is proportional to the machining time, a desired amount of machining is obtained by controlling the machining time. The machining time is determined in accordance with a stop time of the machining electrode with respect to the machining progress portion of the workpiece, and a mean residence time.

Under the above circumstances, the subject matter of the present invention resides in that an endless machining electrode and a workpiece are disposed in gas atmosphere containing a reactive gas and an inactive gas, the machining electrode is rotated at a high speed while maintaining a machining gap between said machining electrode and the machining progress portion of the workpiece, to move the surface of said machining electrode with respect to the machining progress portion at a high speed and to catch the gas by the surface of the machining electrode, thereby forming a gas flow which is transverse to said machining gap, and a high-frequency voltage is applied to the machining electrode to generate plasma in the machining gap, neutral radicals are generated on the basis of the reactive gas, a volatile material generated by the radical reaction of gas with atoms or molecules which constitute the machining progress portion of the workpiece is gasified and removed, and the machining electrode and the workpiece are moved relatively to progress machining.

Subsequently, a description will be given in more detail of the present invention with reference to the accompanying drawings.

FIG. 1 is a schematic diagram explanatorily showing a cutting machining device in accordance with a representative embodiment (first embodiment) of the present invention. In the figure, reference numeral 1 denotes a machining electrode; 2, a workpiece; 3, a high-frequency power supply; 4, a matching device; 5, a feed drive circuit; 6, a rotation drive mechanism; 7, a control unit; and 8, a gap measuring device.

Within the chamber not shown, the endless machining electrode 1 and the workpiece 2 are disposed, and an atmospheric gas containing a reactive gas and an inactive gas which are determined in accordance with the material of the workpiece 2 is sealingly enclosed or circulated. The pressure of the atmospheric gas is realistically about 0.1 to 10 atmospheric pressure, and preferably 1 atmospheric pressure or higher from the viewpoint of the machining efficiency. A machining gap G of 10 to several hundred $\mu$m is formed between the endless portion 9 of the machining electrode 1 and the machining progress portion 10 of the workpiece 2, and a high-frequency power is applied from the high-frequency power supply 3 to the machining electrode 1 through the matching device 4 that matches the power supply 3 with the impedance of a load. With the supply of the high-frequency power to the machining electrode 1, a high electric field is formed in the machining gap G formed between the machining electrode 1 and the machining progress portion 10 to generate plasma of the atmospheric gas existing in that region. The reactive gas existing in the plasma region is excited and activated to produce neutral radicals, and a volatile material generated by the radical reaction of the neutral radical with atoms or molecules which form the workpiece 2 is gasified and removed from the machining progress portion 10. Then, by the feed drive mechanism 5, the machining electrode 1 and workpiece 2 are relatively moved while the machining gap G is maintained and the radical reaction is made, so that the volatile material is gasified from the machining progress portion 10 to progress the machining.

Further, a portion of the machining electrode 1 which contributes to machining is endless (endless portion 9), and the machining electrode 1 is rotated at a high speed by the rotation drive mechanism 6 so that the endless portion 9 is moved at a high speed with respect to the machining progress portion 10, and the gas is caught by the machining electrode surface 11 to form a gas flow which is transverse to the machining gap G so that a large amount of the reactive gas and inactive gas for producing the neutral radicals are supplied in the region between the endless portion 9 and the machining progress portion 10. It should be noted that it is preferable that the machining electrode 1 is rotationally symmetrical with respect to its rotation axis in order to rotate the machining electrode 1 at a high speed and stably by the rotation drive mechanism 6. In this example, in case of this cutting machining device, the machining electrode 1 is in the form of a flat disc and its outer peripheral portion 9a forms the endless portion 9.

Also, the high-frequency power supply 3 and the feed drive mechanism 5 are controlled by the control unit 7 which is made up of a personal computer. In order to prevent the high-voltage circuit from being short-circuited by contacting the machining electrode 1 with the workpiece 2, or in order to maintaining the predetermined machining gap G, the gas measuring device 8 detects a displacement between a support frame 12 of the rotation drive mechanism 6 and the workpiece 2, and sends a detection signal to the control unit 7 to control the feed drive mechanism 5. The feed drive mechanism 5 is a mechanism which appropriately combines a vertically moving stage (the adjustment and maintenance of the machining gap G), an XY stage and a rotating stage. The feed drive mechanism 5 is capable to moving the workpiece 2 relatively with respect to the machining electrode 1 three-dimensionally. Also, the workpiece 2 is held by an electrically conductive mount board 14 that is fixed to an insulator 13 which is built in the feed drive mechanism 5. In the case where the workpiece 2 to be machined is an insulator or a semiconductor, the high-frequency power is supplied between the machining electrode 1 and the mount board 14, or the high-frequency power is supplied to the machining electrode 1, and the mount board 14 is grounded, to thereby concentrate the making electric power to the machining gap G. The mount board 14 used for this purpose serves as an auxiliary electrode. It should be noted that in the case where the workpiece 2 is conductive, the high-frequency power can be directly supplied to the machining electrode 1 and the workpiece 2. It should be noted that, although not shown, the gas containing the volatile material produced by the radical reaction can be again introduced into the above-mentioned chamber after it is exhausted from a suction port disposed in the vicinity of the machining electrode and passes through a filter so as to remove the volatile material therefrom.

In this embodiment, the frequency of the high-frequency power supply 3 is 150 MHz, and power is supplied with a change ranging of several hundred to 1,000 W. Also, since the intensity of an electric field in the machining gap G is about $10^6$ V/m, a voltage applied to the endless portion 9 of the machining electrode 1 is about 100 to 1,000 V depending on the distance of the machining gap G. Also, the r.p.m. of the machining electrode 1 is 5,000 to 18,000 rpm in machining according to the present invention because the machining rate has a tendency to increase more as the r.p.m. is high although depending on the peripheral speed (or the diameter).

An example in which monocrystal silicon is cut using the above cutting machining device will be described below. The machining electrode 1 as used was in the form of a flat disc 120 mm in diameter and 0.5 mm in thickness, and the machining electrode 1 was rotated at a high speed of 18,000 rpm. A case in which the atmospheric gas is composed of only $SF_6$ and He, and a case in which the atmospheric gas is $SF_6$ and He mixed with $O_2$ (the density of $O_2$ is set to be the same as that of $SF_6$), both using $SF_6$ as an active gas and He as an inactive gas, were compared with each other, where the making power of 600 W and 1,000 W was supplied in the respective cases.

Figure 2:
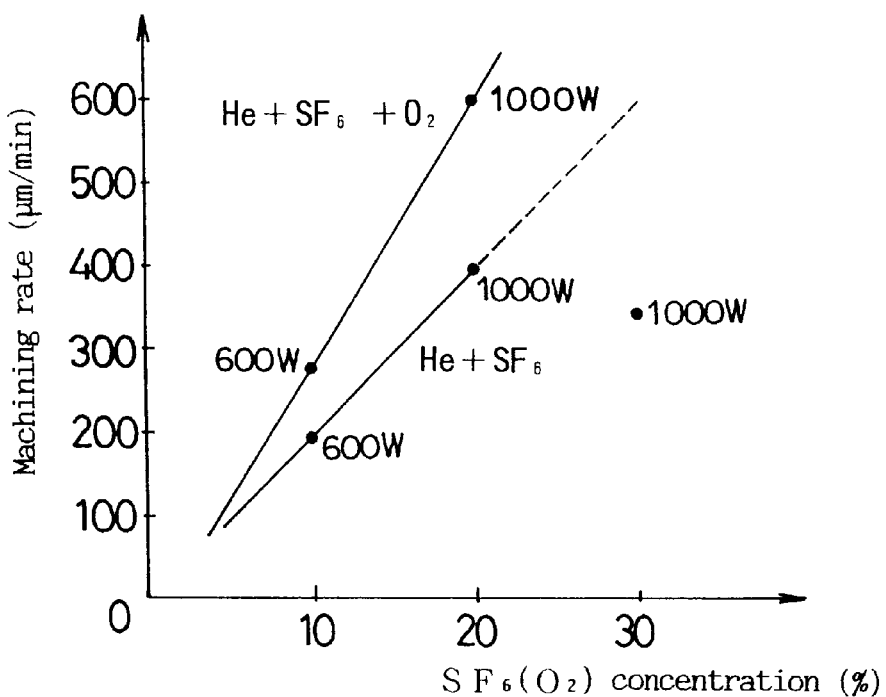
FIG. 2 is a graph showing a relation between the density of $SF_6$ and a machining rate, which is obtained by the cutting machining device shown in FIG. 1.
Figure 3:
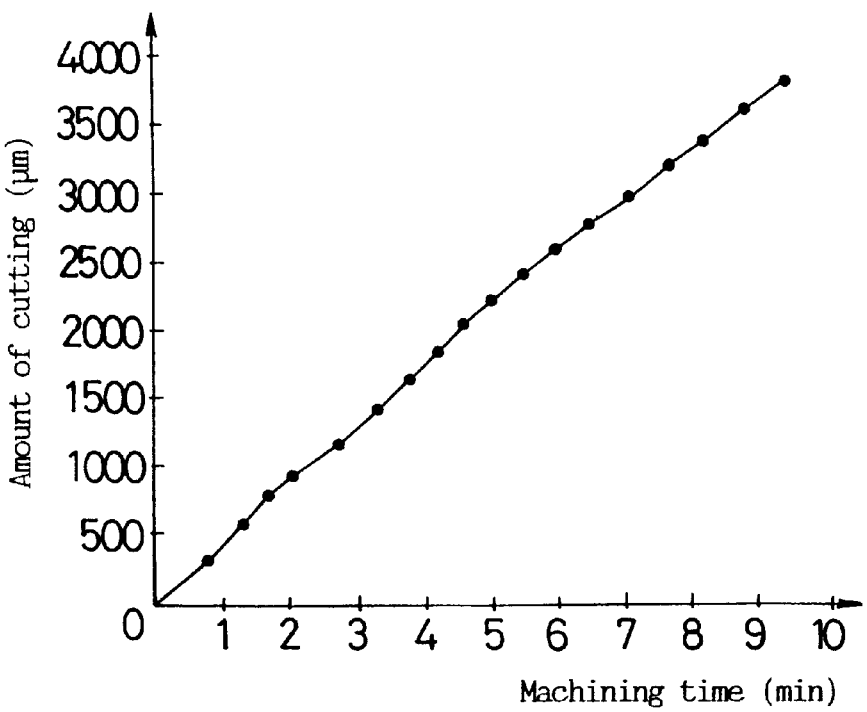
FIG. 3 is a graph showing a relation between a machining time and the amount of cutting machining, which is obtained by the cutting machining device shown in FIG. 1.

Its results are shown in a graph shown in FIG. 2 (the axis of abscissa represents $SF_6$ concentration (%), and the axis of ordinate represents a machining rate ($\mu$m/min). As is apparent from this graph, in a case where the atmospheric gas was the mixed gas of $SF_6$+He+$O_2$ with the concentration of $SF_6$ being 20%, and the making power was 1,000 W, the maximum machining rate of 600 $\mu$m/min was obtained. Also, the results obtained by cutting the workpiece while the condition was fixed where the atmospheric gas was the mixed gas of $SF_6$+He with the concentration of $SF_6$ being 20%, and the making power was 1,000 W were shown in a graph shown in FIG. 3 (the axis of abscissa represents the machining time (min), and the axis of ordinate represents the amount of cutting ($\mu$m). As is apparent from this graph, even though the machined groove (the amount of cutting) is made deep, the cutting machining can be conducted at a substantially constant machining rate (400 $\mu$m/min). It should be noted that at the present time, the machined groove 0.3 mm in width is formed in the workpiece, using the disc-shaped machining electrode which is 0.2 mm in thickness and made of stainless steel.

The effectiveness of the gas supply mechanism by rotating the machining electrode 1 at a high speed in accordance with the present invention has been proved from those graphs. That the concentration of reactive gas was increased by about one digit in comparison with that of the prior art is one factor by which the machining rate was increased. This is because, even though the density of reactive gas was high, the making power was increased so that plasma could be stably generated, and it is needless to say that its fundamental factor attributes to the high-speed rotation of the machining electrode 1. Of course, since a cut surface has no fine cracks and no heat-affected layer, a surface which is excellent in crystallography and electric material can be obtained as in the conventional plasma CVM. In the case where the workpiece 2 is columnar, there has been conventionally proposed that the workpiece 2 is also rotated with the center of its axis. However, the workpiece 2 is rotated slowly to the degree where the rotation of the workpiece 2 can be ignored in comparison with the high-speed rotation of the machining electrode 1, and the rotation of the workpiece 2 has the same meaning as the feed of the workpiece 2 due to the feed drive mechanism 5.

Figure 4:
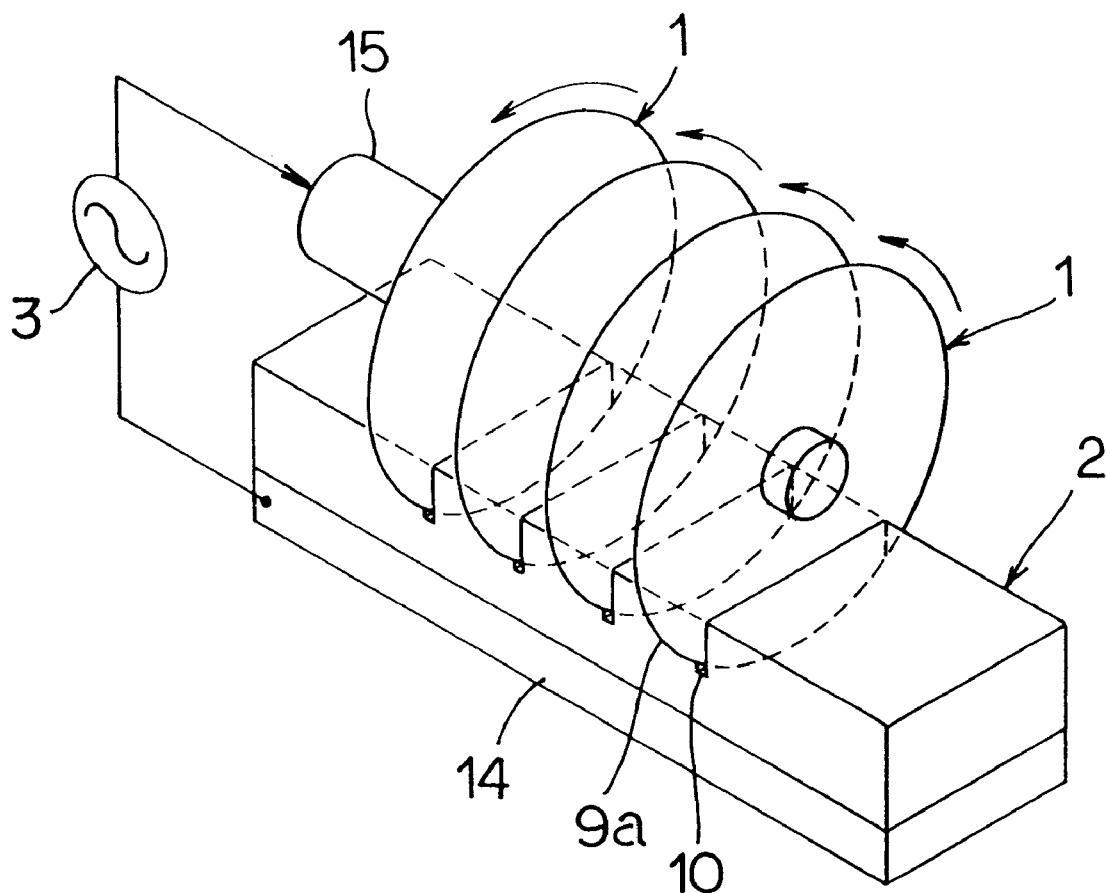
FIG. 4 is a schematically perspective view showing a modified example of a cutting machining device for cutting a plurality of portions of a workpiece simultaneously.

FIG. 4 shows a modified example in which a plurality of the above-mentioned flat disc-shaped machining electrodes 1 are fixed to the same rotary shaft 15 at given intervals, and the workpiece 2 is cut at a plurality of portions, simultaneously.

Figure 5:
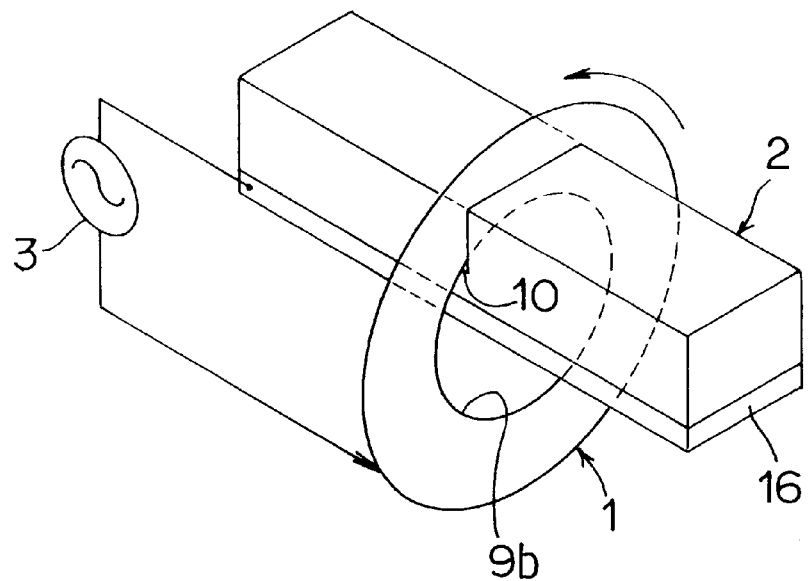
FIG. 5 is a schematically perspective view showing a modified example of a cutting machining device for cutting a workpiece with a large diameter.

Also, FIG. 5 shows the simplification of the cutting machining device effective in a case of cutting the workpiece 2 large in cross area, for example, monocrystal silicon having a large diameter. The machining electrode 1 used in this case is in the form of a hollow flat ring with its inner peripheral portion 9b forming an endless portion 9. It should be noted that the machining electrode 1 is coupled with the rotation drive mechanism 6 at the outer peripheral portion using an appropriate fixing tool. Also, in this case, since the above-mentioned mount board 14 cannot be used, an auxiliary electrode 16 is disposed on the back of the workpiece 2 in such a manner that it faces with the machining electrode 1 so that the machining progress portion 10 of the workpiece 2 is interposed between the machining electrode 1 and the auxiliary electrode 16. The workpiece 2 and the auxiliary electrode 16 are integrally moved with respect to the machining electrode 1, and a high-frequency voltage is applied between the machining electrode 1 and the auxiliary electrode 16. However, the auxiliary electrode 16 is not always necessary in the machining method of the present invention, and the use of the auxiliary electrode 16 enhances the concentration of an electric field in the machining gap G, to thereby facilitate the generation of plasma.

Figure 6:
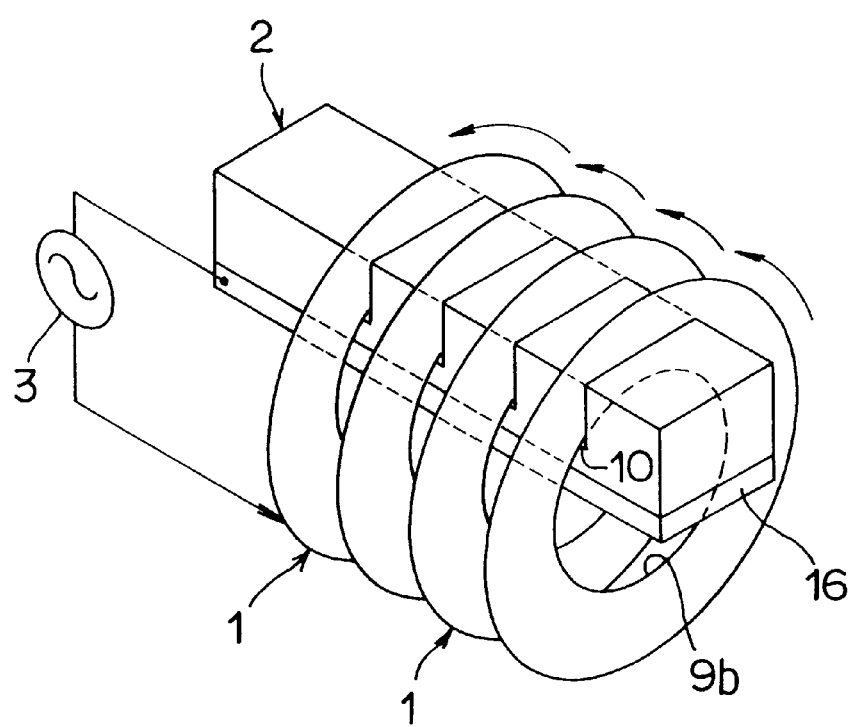
FIG. 6 is a schematically perspective view showing a modified example of a cutting machining device for cutting a plurality of portions of a workpiece with a large diameter, simultaneously.

Also, FIG. 6 shows the simplification of the cutting machining device that cuts the workpiece 2 large in cross area at a plurality of portions simultaneously, in which a plurality of hollow flat disc-shaped machining electrodes 1 are similarly fixed to the same shaft at given intervals and coupled with the rotation drive mechanism 6 by a fixing tool not shown.

Figure 7:
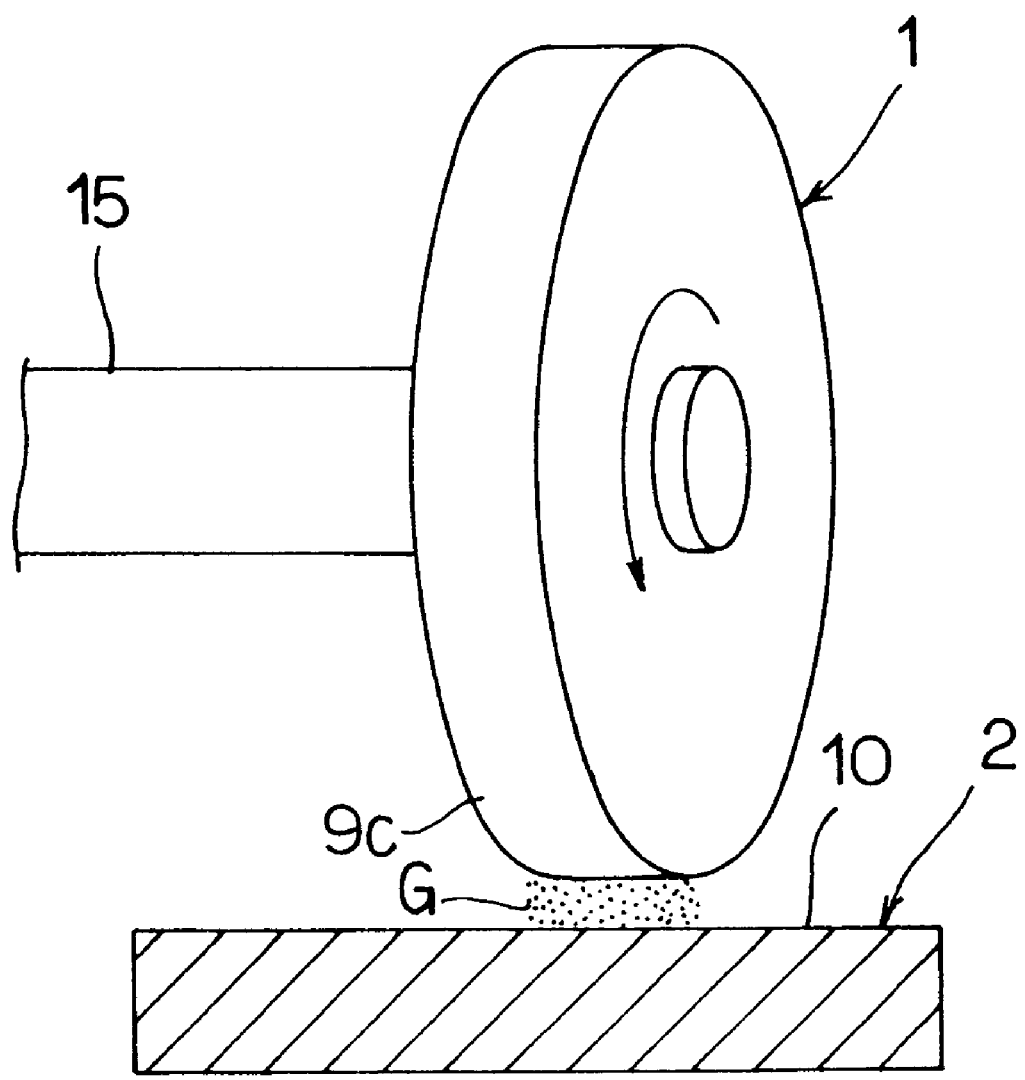
FIG. 7 is a schematically perspective view showing a main portion of a lapping machining device in accordance with a second embodiment of the present invention.

Subsequently, a description will be given of a polishing machining device in accordance with a second embodiment of the present invention. In this example, the machining electrode 1 as used is in the form of a thick disc, a hollow thick disc, a column or a cylinder, and its outer peripheral portion 9c or the inner peripheral portion 9d has a bus which is in parallel with the rotation axis. In other words, the outer peripheral surface 9c which is in the form of the thick disc or the column forms the endless portion 9, and the inner peripheral surface 9d which is in the form of the hollow thick disc or the cylinder forms the endless portion 9. In this example, there is shown a machining example in which a thick disc-shaped electrode 100 mm/Φ in diameter and 20 mm in thickness shown in FIG. 7 is used as the machining electrode 1. It should be noted that the specific cross-sectional shape of the outer peripheral surface 9c of the machining electrode 1 has a plane 10 mm in width which is in parallel with the rotation axis at its center portion, and its both edge portions are chamfered with an arc 5 mm in radius. In this example, reference numeral 15 in the figure denotes a rotation shaft that forms the rotation drive mechanism 6.

Figure 8:
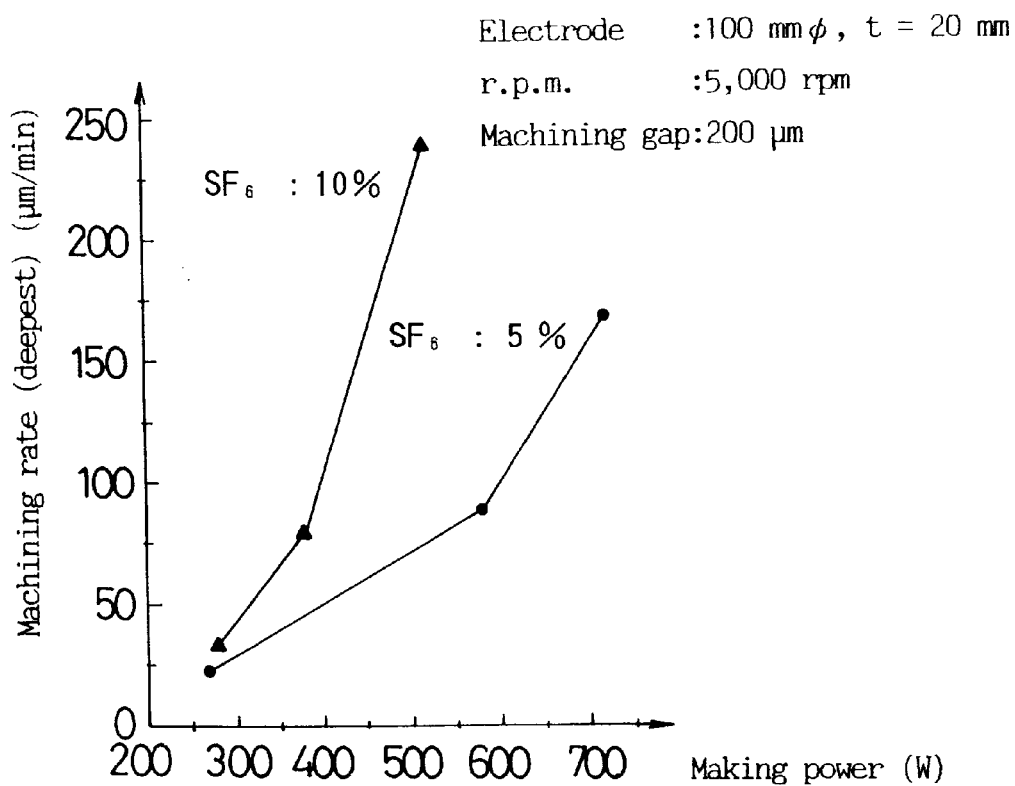
FIG. 8 is a graph showing a relation between a making power and a machining rate (the deepest), which is obtained by the device shown in FIG. 7.
Figure 9:
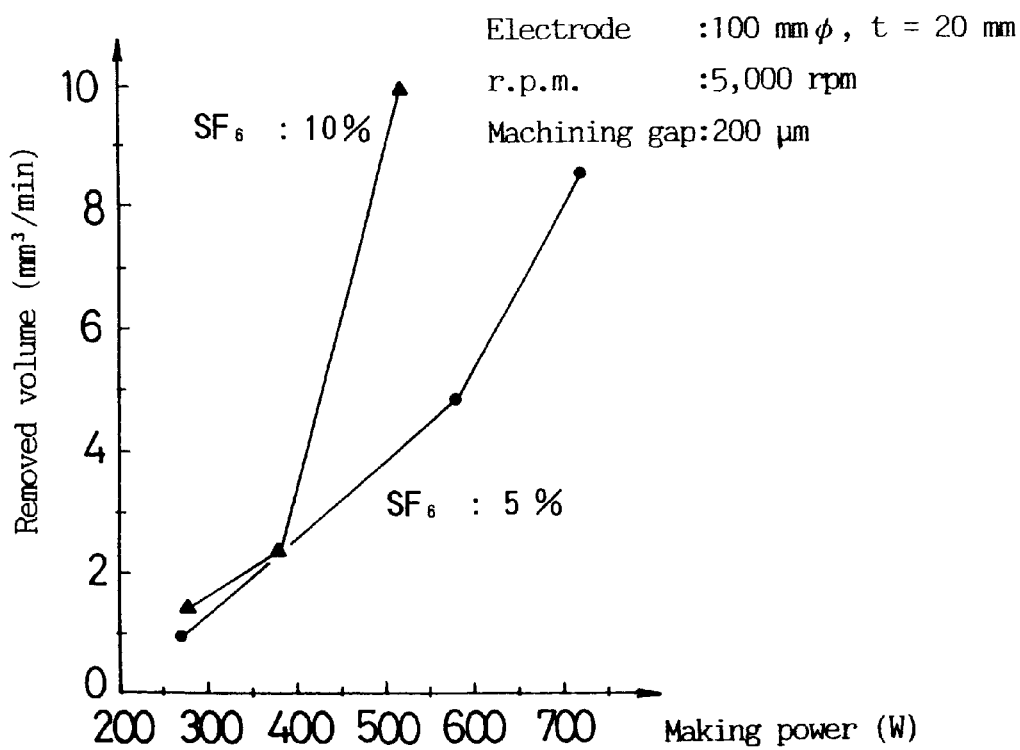
FIG. 9 is a graph showing a relation between -he making power and a removed volume, which is obtained by the device shown in FIG. 7.

Under the machining conditions where a mixed gas having $SF_6$ diluted with He is used as the atmospheric gas, the r.p.m. is 5,000 rpm, the machining gap is 200 $\mu$m, the machining time is 1 minute, the machining rate (deepest) and removed volume when the making power is changed, and a silicon wafer is polished were, measured for the cases where the concentration of $SF_6$ is 5% and 10%. A graph shown in FIG. 8 was obtained with the making power (W) as the axis of abscissa and with the machining rate (deepest) ($\mu$m/min) as the axis of ordinate, and a graph shown in FIG. 9 was obtained with the making power (W) as the axis of abscissa and with the removed volume (mm$^3$/min) as the axis of ordinate. It is proved from those results that a high machining rate such as about 200 $\mu$m/min is obtained even in the polishing machining.

Figure 10:
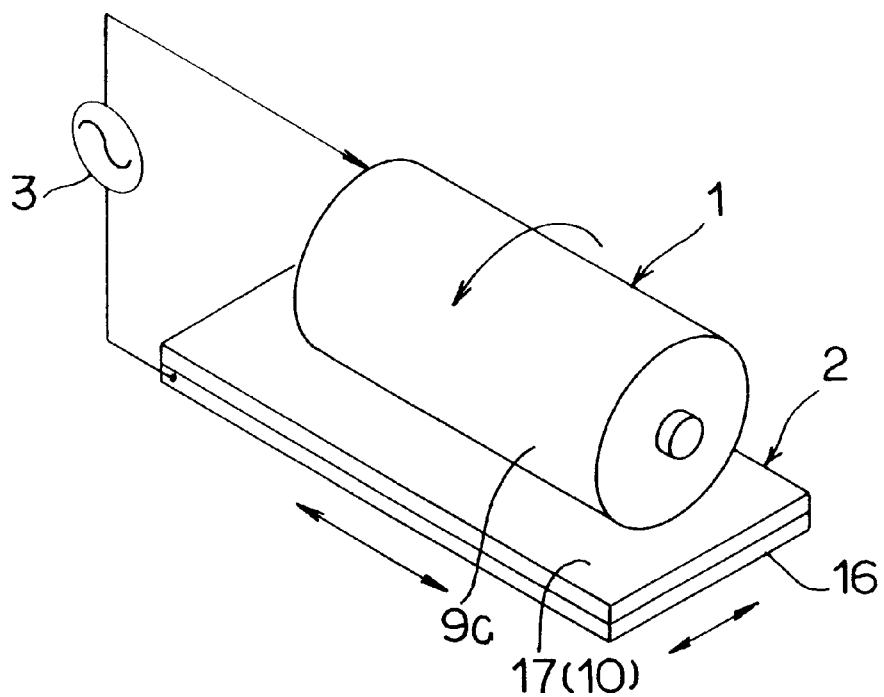
FIG. 10 is a schematically perspective view showing a modified example of the lapping machining device in a case where the surface of a plate workpiece is lapped by a columnar machining electrode.
Figure 11:
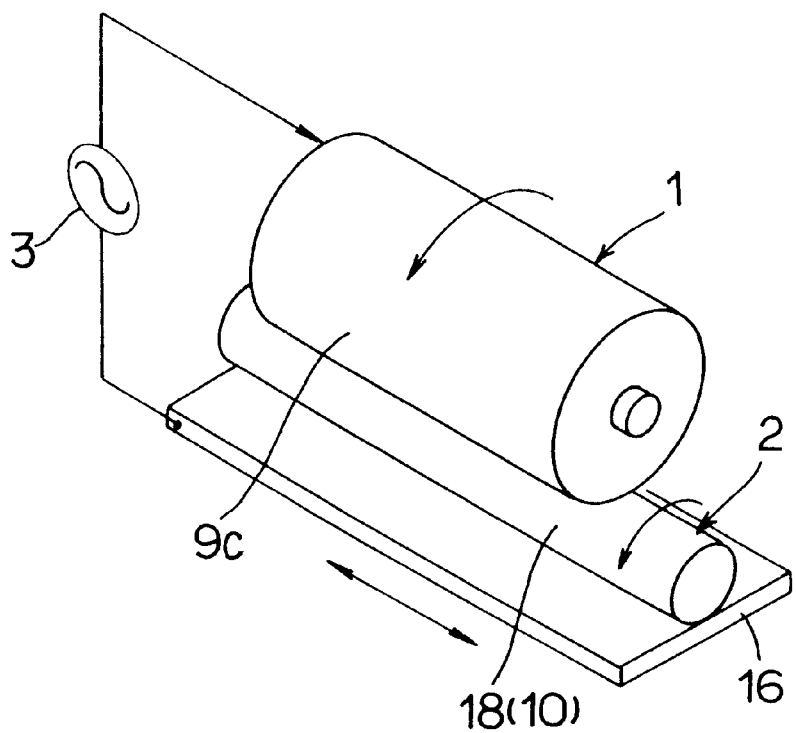
FIG. 11 is a schematically perspective view showing a modified example of the lapping machining device in a case where the outer peripheral surface of a columnar workpiece is lapped by a columnar machining electrode.
Figure 12:
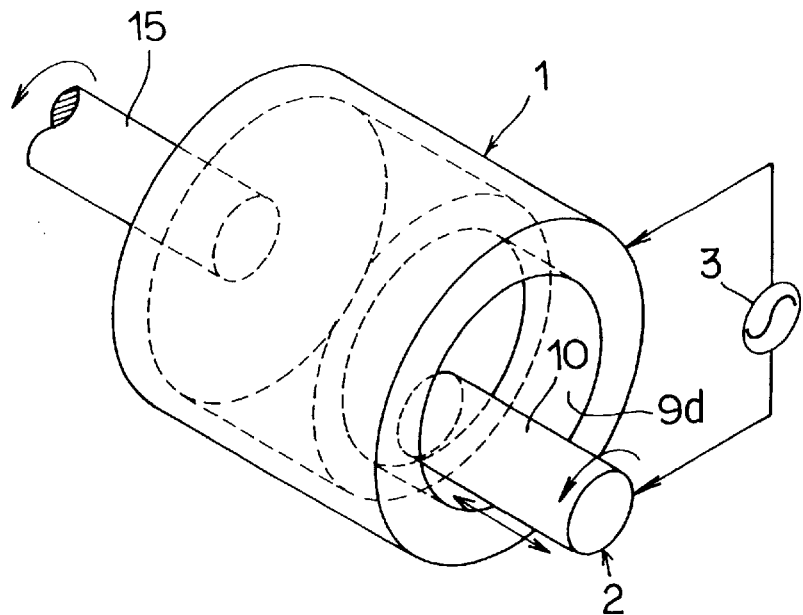
FIG. 12A is a schematically perspective view showing a modified example of the lapping machining device in a case where the outer peripheral surface of a columnar workpiece is lapped by a cylindrical machining electrode.
FIG. 12B is a cross-sectional view thereof.
FIG. 12C is a side view thereof.
Figure 12:
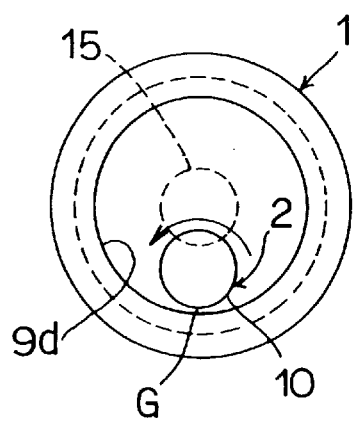
Figure 12:
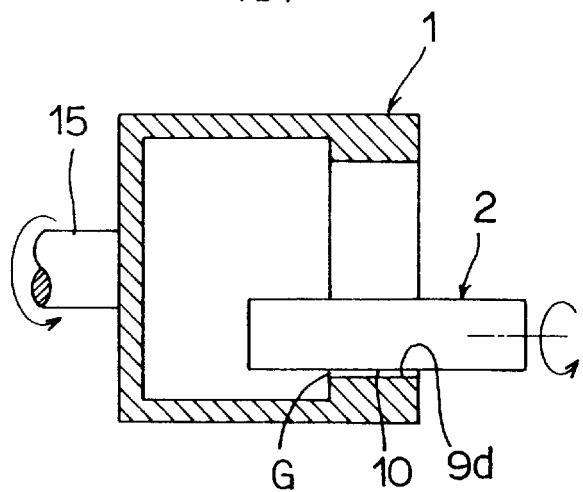
Figure 13:
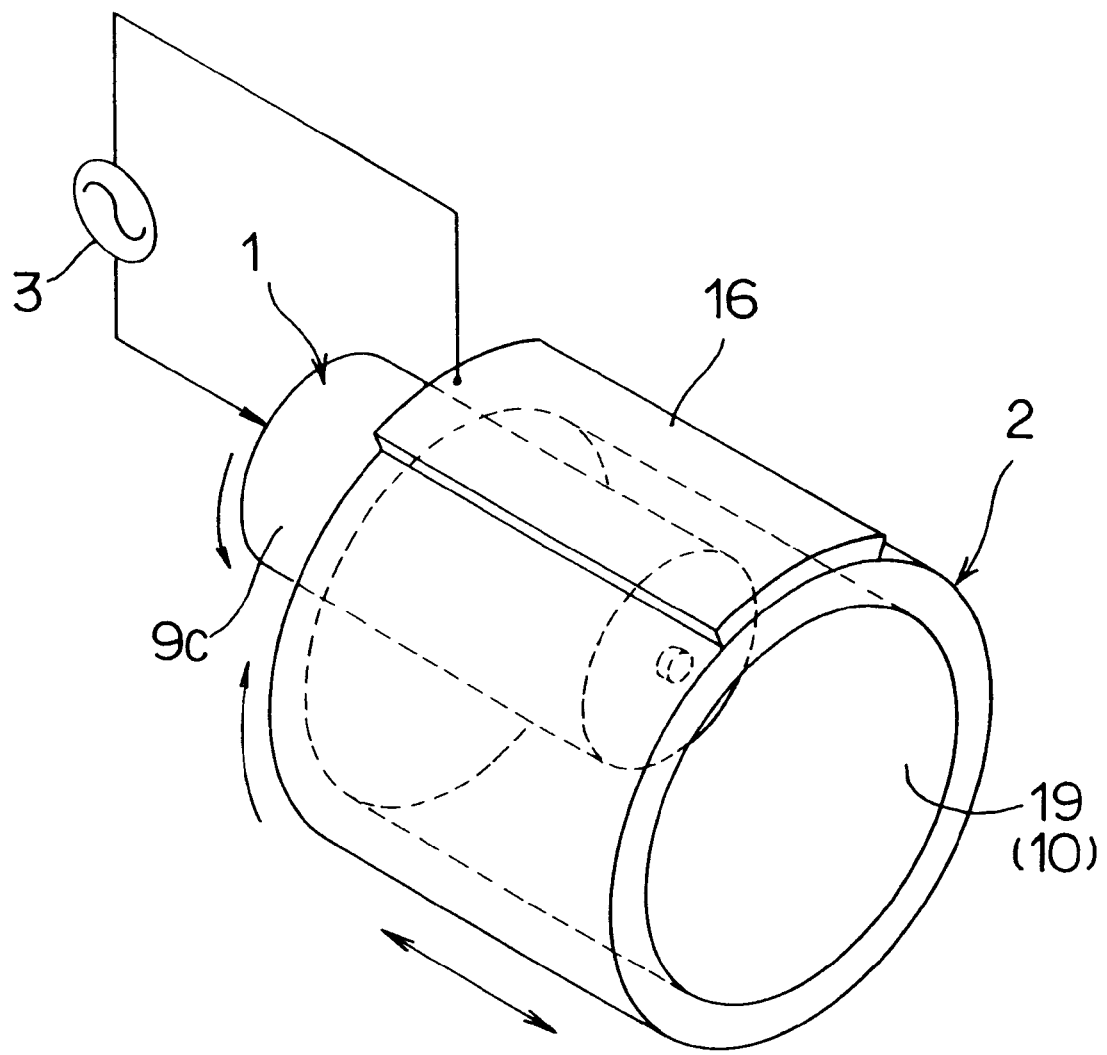
FIG. 13 is a schematically perspective view showing a modified example of the lapping machining device in a case where the inner peripheral surface of a cylindrical workpiece is lapped by a columnar machining electrode.

FIGS. 10 to 13 show modified examples of a polishing machining device. FIG. 10 shows an example in which a surface 17 (machining progress portion 10) of a plate-shaped workpiece 2 is polished using a machining electrode 1 which is in the form of column and has its outer peripheral surface 9c forming an endless portion 9, and FIG. 11 shows an example in which the outer peripheral surface 18 (machining progress surface 10) of a columnar workpiece 2 is polished using the same machining electrode 1 as that in the above example. Further, FIGS. 12A to 12C show an example in which an outer peripheral portion 18 of a columnar workpiece 2 is polished using a machining electrode 1 which is in the form of a cylinder, has a partially annular thick portion formed in its inner peripheral portion and has its inner peripheral surface 9d forming an endless portion 9. FIG. 13 shows an example in which an inner peripheral surface 19 (machining progress portion 10) of a cylindrical workpiece 2 is polished using the same machining electrode 1 as that shown in FIGS. 10 and 11. It should be noted that it is preferable that the machining electrode 1 is rotated slowly about the axis of the workpiece 2 in the case where the workpiece 2 is columnar or cylindrical. Also, in those examples, in the case of FIG. 10, the auxiliary electrode 16 is made into the form of a plate and bought into close contact with the back surface of the workpiece 2, and in the case of FIG. 11, the auxiliary electrode 16 is made into the form of a plate, and is disposed out of or in contact with the peripheral surface of the workpiece 2. In the case of FIG. 12, the auxiliary electrode 16 is made into the form of a curve although not shown, and disposed within the machining electrode 1 and out of or in contact with the outer peripheral surface of the workpiece 2, and in the case of FIG. 13, the auxiliary electrode 16 is made into the form of a curve, and disposed out of or in contact with the outer peripheral surface of the workpiece 2. Since there is a case in which an abrasion occurs on the workpiece 2 by the rotation of the workpiece 2 in the case where the workpiece 2 is in contact with the auxiliary electrode 16, it is preferable that they is out of contact with each other.

Figure 14:
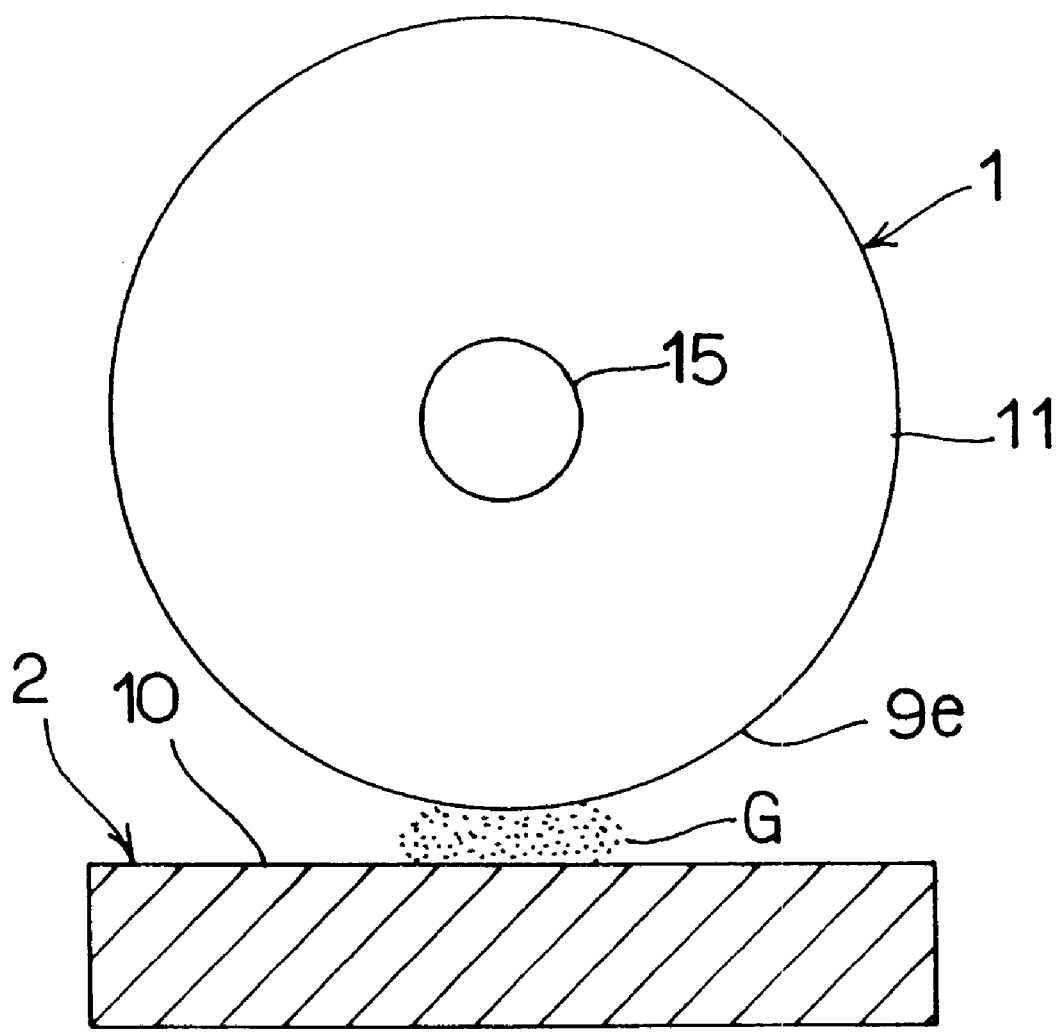
FIG. 14 is a schematic view explanatorily showing a numerically controlled machining device for an arbitrary shape in accordance with a third embodiment of the present invention.

Subsequently, a description will be given of a numerically-controlled machining device for an arbitrary shape in accordance with a third embodiment of the present invention, which shows an example in which using the machining electrode 1 which is in the form of a sphere or a thick disc or flat disc having an arc swelling on its outer peripheral portion, and which has the outer peripheral portion 9e forming the endless portion 9, a relative position between the machining electrode 1 and the workpiece 2 and the machining time are numerically controlled and changed to machine the surface of the workpiece 2 in an arbitrary shape. In this case, a part of the outer peripheral portion 9e of the machining electrode 1 which corresponds to the machining gap G forms the electric field concentrated portion. In this example, there are exhibited the experimental results of the machining characteristics of monocrystal silicon using the spherical machining electrode 1 which is 30 mmΦ as shown in FIG. 14.

Figure 15:
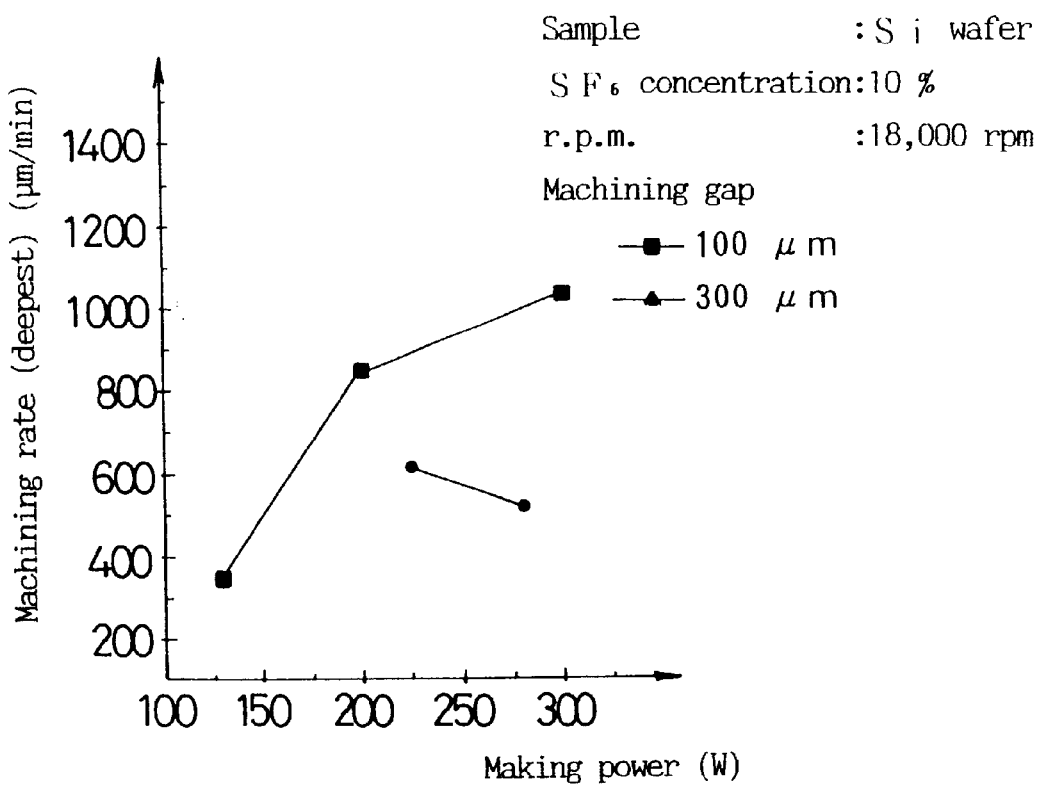
FIG. 15 is a graph showing a relation between a making power and a machining rate (the deepest), which is obtained by the device shown in FIG. 14.
Figure 16:
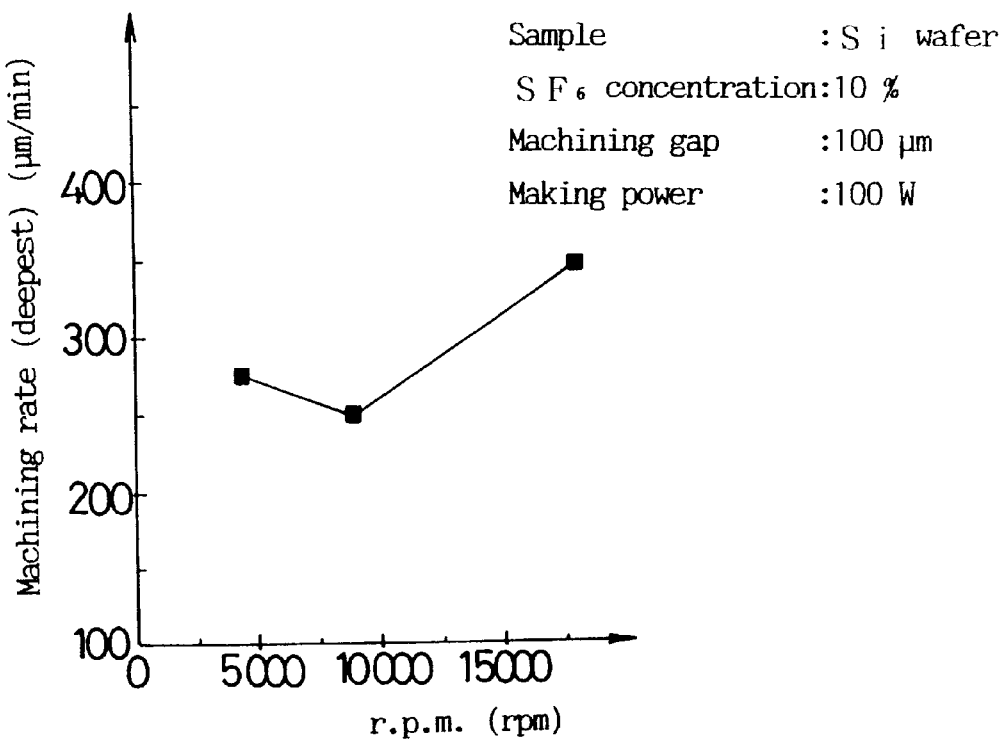
FIG. 16 is a graph showing a relation between r.p.m. and the machining rate (the deepest), which is obtained by the device shown in FIG. 14.

Under the machining conditions where a mixed gas having $SF_6$ (the concentration of 10%) diluted with He is used as the atmospheric gas, the r.p.m. is 18,000 rpm, the machining gap is 100 $\mu$m and 200 $\mu$m, the machining time is 1 minute, the machining rate (deepest) when the making power is changed, and a silicon wafer is machined was measured, and also under the same atmospheric gas, the machining gap is 100 $\mu$m and the making power is fixed to 100 W, the machining rate (deepest) when the r.p.m. is changed, and a silicon water is machined was measured. A graph shown in FIG. 15 was obtained with the making power (W) as the axis of abscissa and with the machining rate (deepest) ($\mu$m/min) as the axis of ordinate, and a graph shown in FIG. 16 was obtained with the r.p.m. as the axis of abscissa and with the machining rate (deepest) ($\mu$m/min) as the axis of ordinate.

It was proved from those results that although there is a little error in measurement, if other conditions are the same, the machining rate is higher as the machining gap is small, and in the case where the machining gap is 100 $\mu$m, as the making power is large, the machining rate is higher, and also, as the r.p.m. is high, the machining rate is higher. In addition, the machining rate as achieved was 300 to 1,000 $\mu$m/min.

Figure 17:
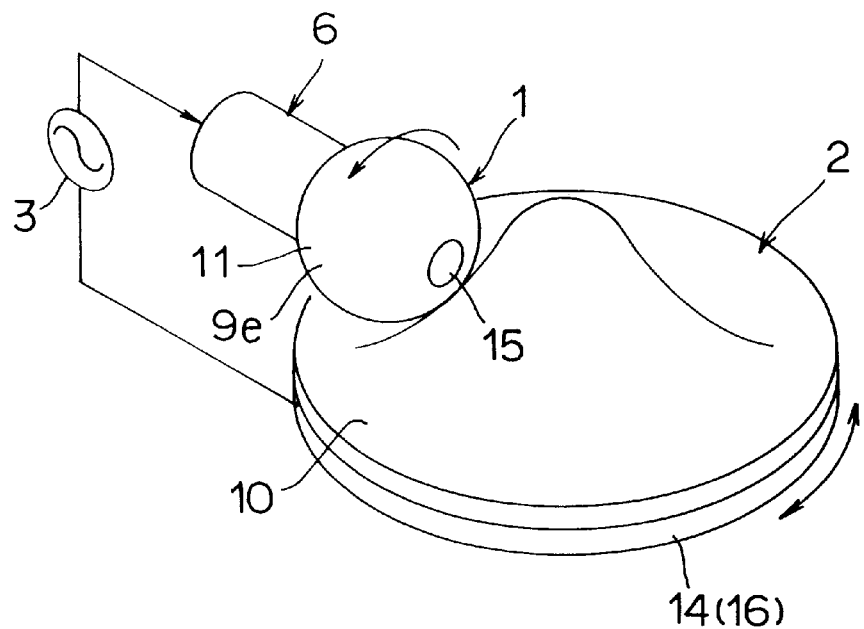
FIG. 17 is a schematically perspective view showing a state in which a workpiece is machined by the device shown in FIG. 14 using a spherical machining electrode.

FIG. 17 shows a state in which the surface of the workpiece 2 is machined in an arbitrary shape by the above numerically controlled machining device. Specifically, the kind, the combination and the mixing ratio of a reactive gas and an inactive gas are selected in accordance with the material of the workpiece 2, and the machining gap, the making power and the r.p.m. are set, and as a result, the relation between the machining time and the machining amount, that is, the machining rate is determined. In the case where the relation between the machining time and the machining amount is linear, the machining rate is inputted to the control unit 7 in advance, and in the case where the relation therebetween is nonlinear, the correlative data of the machining time and the machining amount is inputted to the control unit 7 in advance. Also, the surface shape of the workpiece 2 before machining is accurately measured and inputted to the control unit 7. A difference between the surface shape of the workpiece 2 before machining and a desired surface shape is calculated, and a machining amount of the workpiece 2 on coordinates is calculated, according to which a mean time (machining time) during which the machining electrode 1 is resident at a specific position of the workpiece 2 is determined. On the basis of those numerical data, the feed drive mechanism 5 is controlled so that the machining electrode 1 and the workpiece 2 are relatively moved to machine the workpiece 2 in an arbitrary shape.

Figure 18:
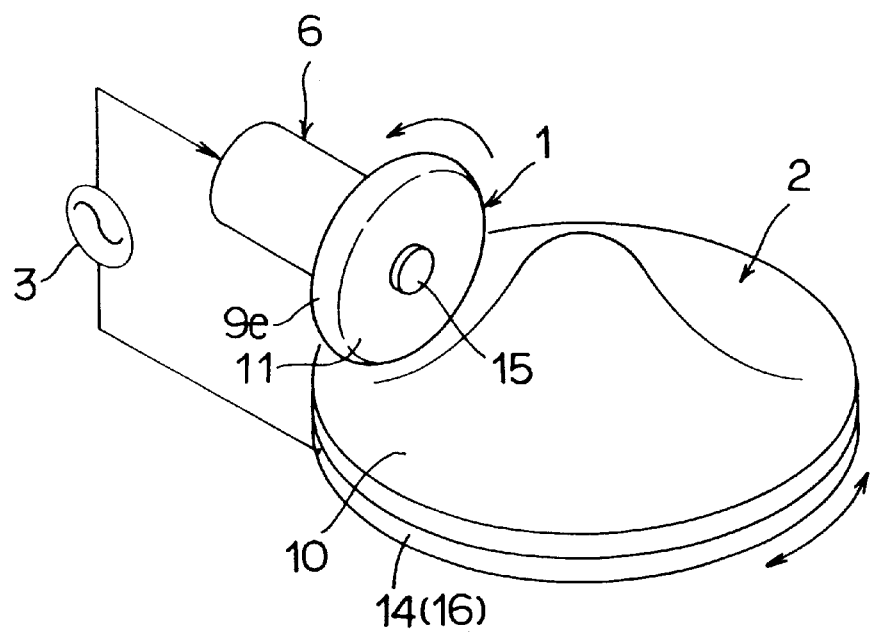
FIG. 18 is a schematically perspective view showing a state in which a workpiece is machined by the device shown in FIG. 14 using a thick disc-shaped machining electrode having an arc swelling on its outer peripheral portion.
Figure 19:
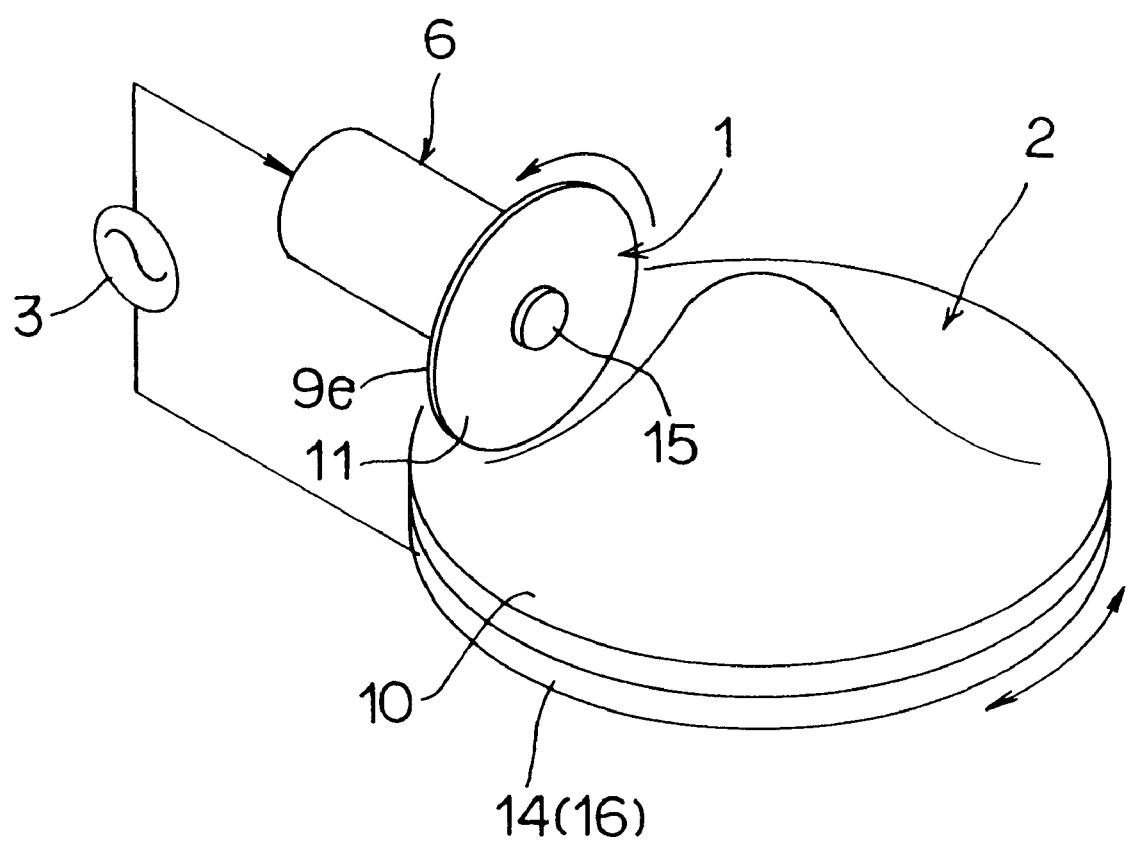
FIG. 19 is a schematically perspective view showing a state in which a workpiece is machined by the device shown in FIG. 14 using a flat disc-shaped machining electrode.

FIGS. 18 and 19 show machining electrodes 1 of other shapes which can be used for the numerically controlled machining device. The machining electrode 1 shown in FIG. 18 is in the form of a thick disc having an arc swelling at its outer peripheral portion, and the machining electrode 1 shown in FIG. 19 is in the form of a flat disc which is the same as that used in the cutting machining device. In both of the machining electrodes, the outer peripheral portion 9e having an arc swelling forms the endless portion 9 in which an electric field is concentrated.

Figure 20:
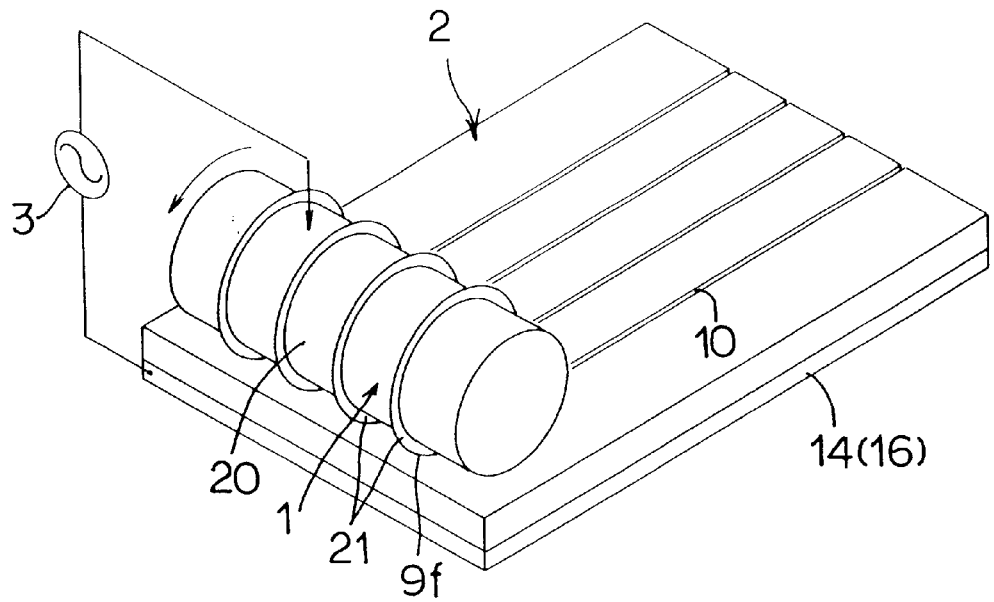
FIG. 20 is a schematically perspective view showing a dicing machining device in accordance with a fourth embodiment of the present invention.

Subsequently, a description will be given of a dicing machining device in accordance with a fourth embodiment of the present invention, with reference to FIG. 20.

In this embodiment, there is used a machining electrode 1 which is shaped so that a single or a plurality of ring-shaped blades 21 are projected at appropriate intervals on the outer periphery of an electrode base body 20 which is formed of a cylindrical body or a columnar body, and the outer peripheral portions 9f of the blades 21 constitute endless portions 9. Then, a plate-like workpiece 2 is diced or the surface of the workpiece 2 is grooved by the blades 21. In the case of the grooving machining, the surface of the workpiece 2 can be polished slowly by the outer peripheral surface of the electrode base body 20.

Figure 21:
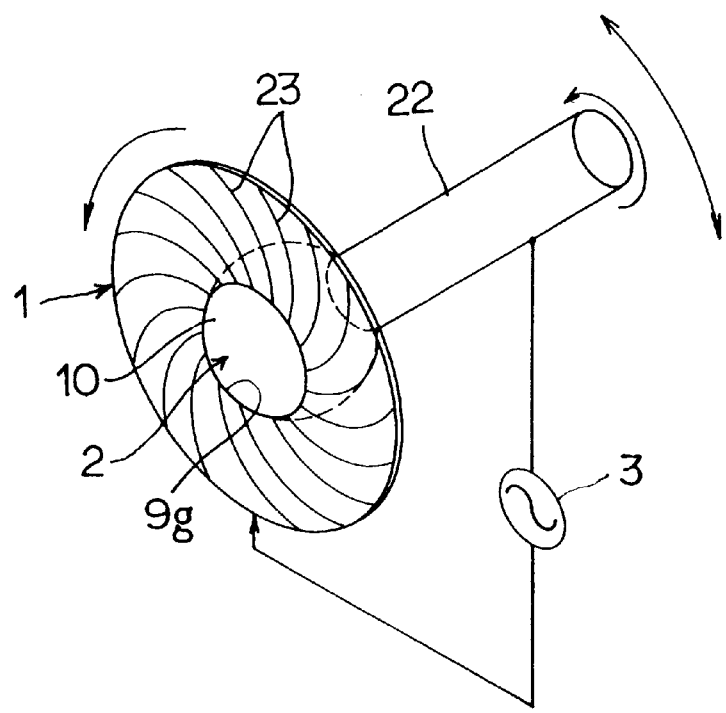
FIG. 21 is a schematically perspective view showing a spherical-surface machining device in accordance with a fifth embodiment of the present invention.

Subsequently, a description will be given in brief of a spherical surface machining device in accordance with a fifth embodiment of the present invention with reference to FIG. 21. The machining electrode 1 of this embodiment is the same as that in the modified example of the cutting machining device. That is, there is used the machining electrode 1 which is in the form of a hollow flat ring an inner peripheral portion 9g of which constitutes the endless portion 9. Also, the workpiece 2 which has been roughly machined in a sphere in advance is fixed concentrically to a rotating shaft 22 which is sufficiently smaller in diameter than the workpiece 2. The diameter of the center circular hole (inner peripheral portion 9g) of the machining electrode 1 is set to be smaller than the diameter of the workpiece 2. Then, the inner peripheral portion 9g of the machining electrode 1 is allowed to approach the spherical surface of the workpiece 2 with a machining gap, and while the machining electrode 1 is rotated at a high speed, and the rotating shaft 22 is rotated at a low speed, the surface of the workpiece 2 is polished with a change in the angle of the rotating shaft 22 with respect to the center of the workpiece 2. In this example, spiral recess grooves 23 are formed on the side surface of the machining electrode 1 at given intervals, and a gas which is caught by the surface while the machining electrode 1 rotates at a high speed is forcedly sent to the center portion by the spiral recess grooves 23 to form a gas flow which is transverse to the machining gap. The rotating shaft 22 can be used as the auxiliary electrode.

Figure 22:
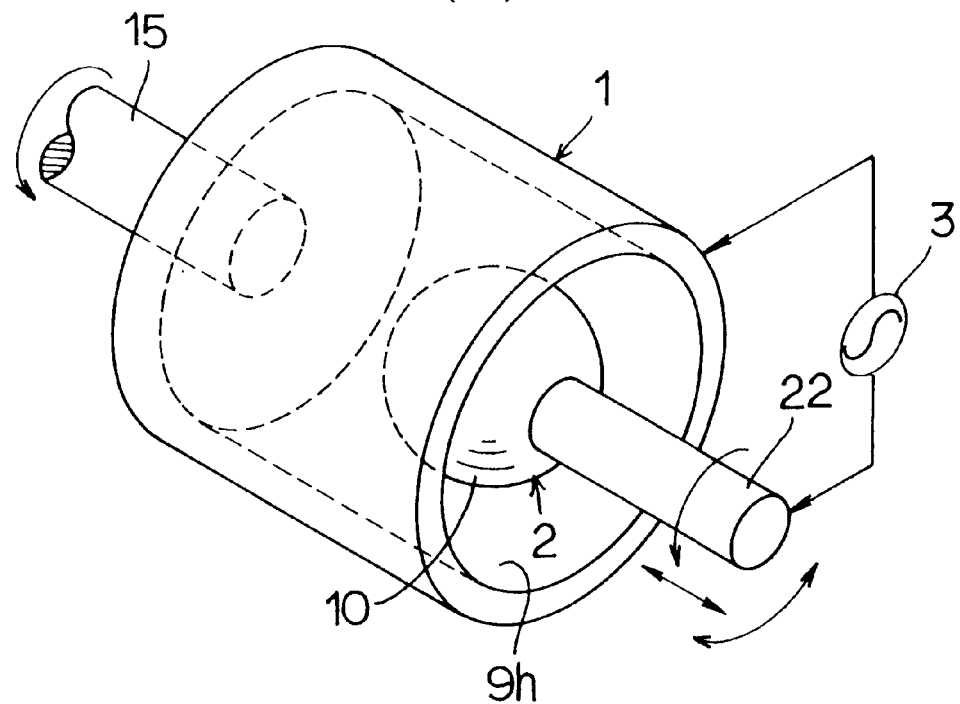
FIG. 22A is a schematically perspective view showing a modified example of the spherical-surface machining device.
FIG. 22B is a cross-sectional view thereof.
FIG. 22C is a side view thereof viewed From the rotating-axial direction.
Figure 22:
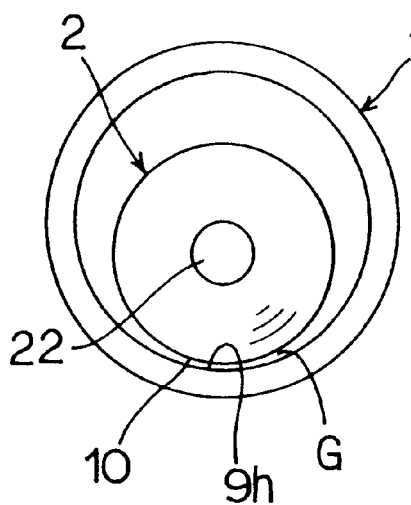
Figure 22:
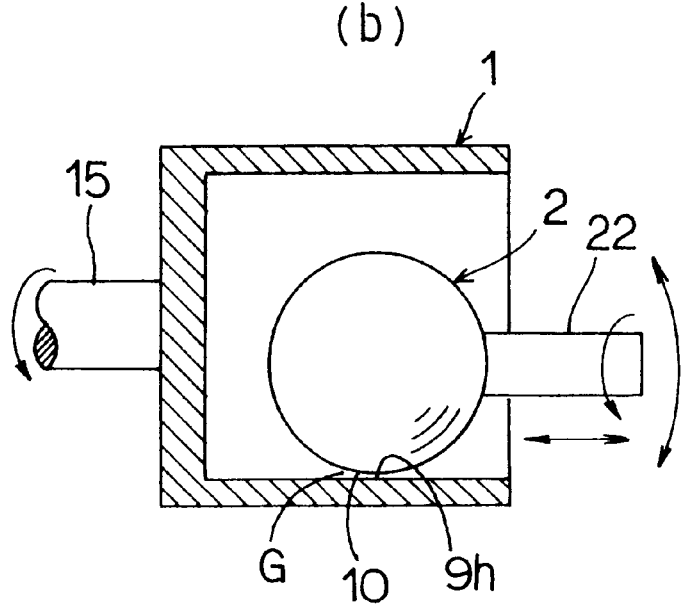

Further, FIGS. 22A to 22C show another example of a sphere machining device. The machining electrode 1 in this example is in the form of a cylinder one end of which is closed and an inner peripheral surface 9h of which constitutes an endless portion 9. The same spherical workpiece 2 as that in the above example is disposed inside of the machining electrode 1, and while the machining electrode 1 is rotated at a high speed, and the workpiece 2 is rotated at a low speed, the surface of the workpiece 2 is polished with a change in the angle of rotating shaft 22.

Figure 23:
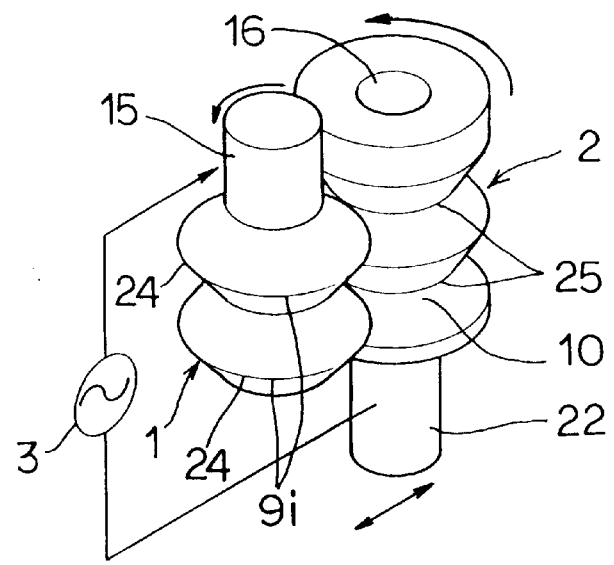
FIG. 23 is a schematically perspective view showing a shape-transfer machining device in accordance with a sixth embodiment of the present invention.
Figure 24:
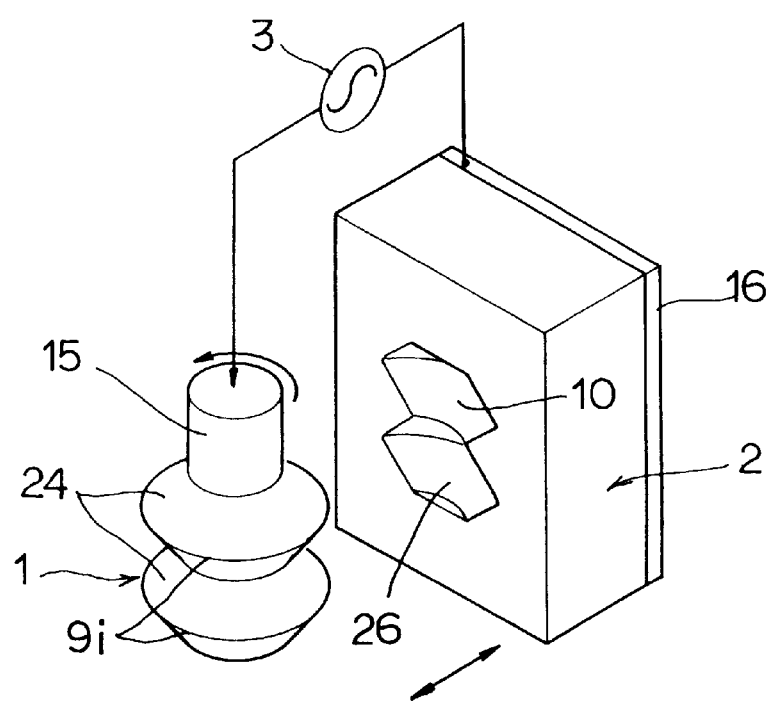
FIG. 24 is a schematically perspective view showing another example for use of the shape-transfer machining device shown in FIG. 23.
Figure 25:
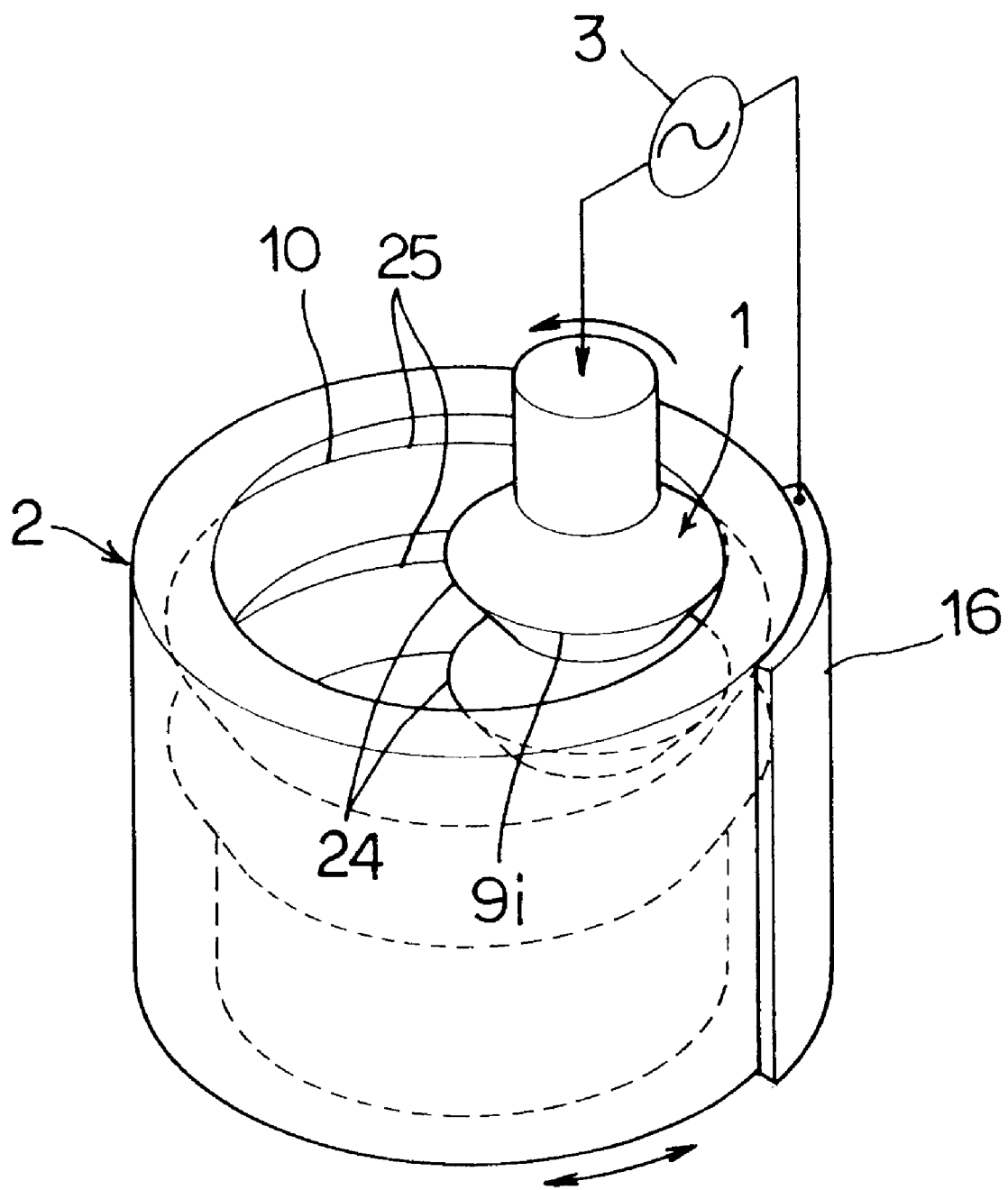
FIG. 25 is a schematically perspective view showing still another example for use of the shape-transfer machining device shown in FIG. 23.

Subsequently, a description will be described in brief of a shape-transfer machining device in accordance with a sixth embodiment of the present invention with reference to FIGS. 23 to 25. The machining electrode 1 of this embodiment has a part of a cross section along the axial direction, which is the same shape as a cross-sectional shape into which the workpiece 2 is formed. In the example shown, the machining electrode 1 is made up of two swelling portions 24 which have an axial cross section of hexagon, which are rotationally symmetrical, and which are along the axial direction. The outer peripheral portion 9i of the swelling portion 24 constitutes the endless portion 9. As shown in FIG. 23, with the machining electrode 1 rotating at a high speed while the columnar workpiece 2 rotates about the rotating shaft 22 at a low speed, two triangular grooves 25 which are triangle in cross section are formed on the outer peripheral surface of the workpiece 2. In this case, a part of the rotating shaft 22 which has been fitted into the center portion of the workpiece 2 serves as the auxiliary electrode 16. Also, as shown in FIG. 24, a recess portion 26 having such a shape that the two swelling portions 24 are cut by a plane which is in parallel with axial direction is formed on the surface portion of the block-shaped workpiece 2. Then, as shown in FIG. 25, while the cylindrical workpiece 2 is rotated about its axis at a low speed, the machining electrode 1 that approaches its inner peripheral surface is rotated at a high speed, to thereby form two triangular grooves 25 on the inner peripheral surface of the workpiece by the two swelling portions 24. It should be noted that the cross-sectional shape of the machining electrode 1 is arbitrary, and that shape is transferred to the workpiece 2.

Figure 26:
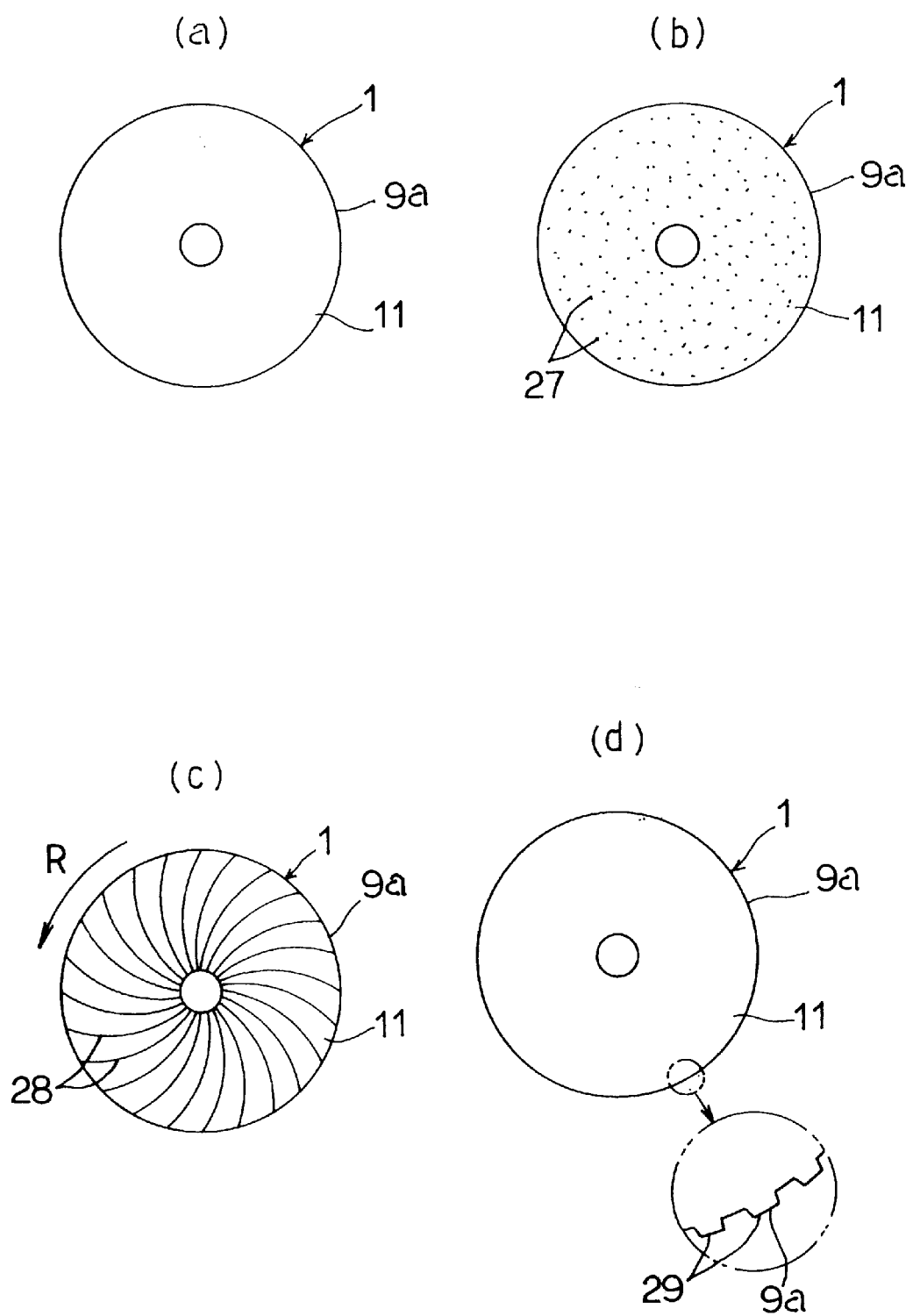

In this example, FIG. 26A shows a machining electrode 1 which is in the form of a flat disc used in the cutting machining device, in which the surface 11 (side surface and outer peripheral portion 9a) is smooth. The feature of the present invention resides in that the machining electrode 1 is rotated at a high speed so that a gas is caught by its surface to form a gas flow which is transverse to the machining gas, and an embodiment for further enhancing its action will be shown. FIG. 26B shows an example in which a large number of fine irregularities 27 are formed at random on the side surface of the machining electrode 1 of FIG. 26A, and for example, the surface 11 of the machining electrode 1 can be formed by blast processing. FIG. 26C shows an example in which a large number of spiral recess grooves 28 directed to a direction in which a gas caught by the side surface with respect to a rotating direction R shown in the side surface of the machining electrode 1 of FIG. 26A is fed to the outer peripheral portion 9a are formed at given intervals. FIG. 26D shows that the gear-shaped concave and convex are formed on the outer peripheral portion 9a of the machining electrode 1 as shown in FIG. 26A at given intervals, that is, the convex 29 are formed at given intervals. In the case of forming the convex 29, an electric field is concentrated at this portion, and plasma is intermittently generated and extinguished, thereby being capable of preventing the plasma from being shifted to arc discharge. This means that with the prevention of the emission of thermoelectron from the machining electrode 1 and the collision of ions to the machining electrode 1 from being repeated on a specific portion of the machining electrode 1, the shifting to arc discharge can be prevented. Also, although not shown, if the surface 11 of the machining electrode 1 shown in FIGS. 26A to 26D is subjected to coating of a corrosion material such as alumina coating (coating of $Al_2O_3$), the corrosion of the electrode is improved, and plasma can be prevented from being shifted to arc discharge. This is because secondary electrons are not limitlessly emitted from the alumina layer, and the surface comes to a charged state. Furthermore, the above-mentioned respective means can be combined appropriately.

Figure 27:
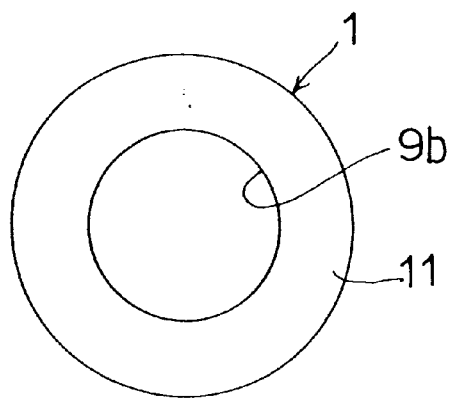
Figure 27:
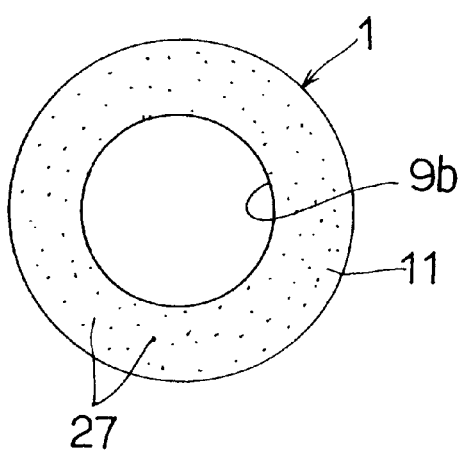
Figure 27:
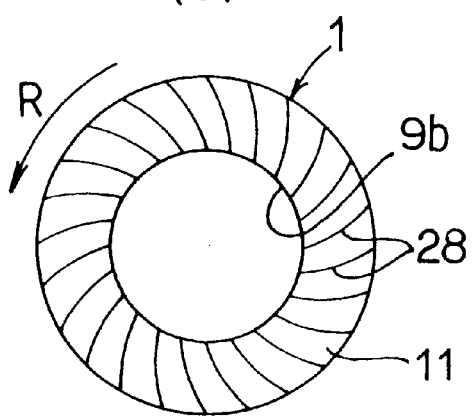
Figure 27:
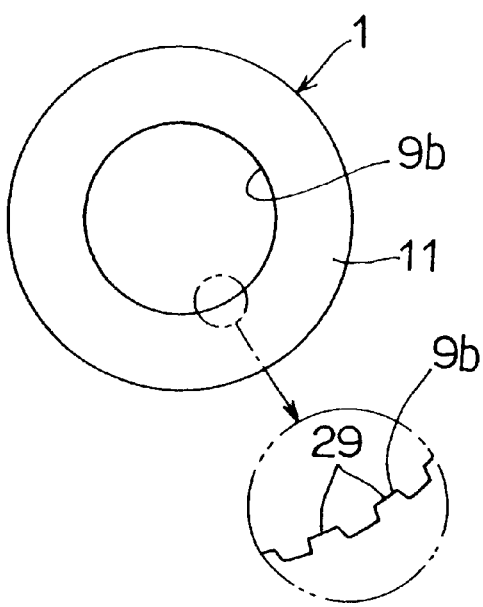

Similarly, FIGS. 27A to 27D show an embodiment of a machining electrode 1 which is capable of being used in the cutting machining device for cutting the workpiece 2 having a large diameter. FIG. 27A shows a machining electrode 1 having a smooth surface 11 used for cutting the above workpiece 2 having a large diameter. Even in cutting using this machining electrode 1, the machining rate of 200 $\mu$m/min is obtained, but in order to further increase the machining rate, it is necessary to facilitate the catching of gas. FIG. 27B shows an example in which a large number of fine irregularities 27 are formed at random on the side surface of the machining electrode 1 shown in FIG. 27A, for example, which can be formed by blasting the surface 11 of the machining electrode 1. FIG. 27C shows an example in which a large number of spiral recess grooves 28 directed to a direction in which a gas caught by the side surface with respect to a rotating direction R shown in the side surface of the machining electrode 1 of FIG. 27A is fed to the inner peripheral portion are formed at given intervals. FIG. 27D shows that the gear-shaped concave and convex are formed in an inner peripheral portion of machining electrode 1 as shown in FIG. 27A at given intervals, that is, convex portions 29 are formed at given intervals. In the case of forming the convex portions 29, an electric field is concentrated at this portion, and plasma is intermittently generated and extinguished, thereby being capable of preventing the plasma from being shifted to arc discharge. Also, although not shown, if the surface of the machining electrode 1 shown in FIGS. 27A to 27D is subjected to alumina coating or the like, the corrosion of the electrode is improved, and plasma can be prevented from being shifted to arc discharge. Furthermore, the above-mentioned respective means can be combined appropriately.

Figure 28:
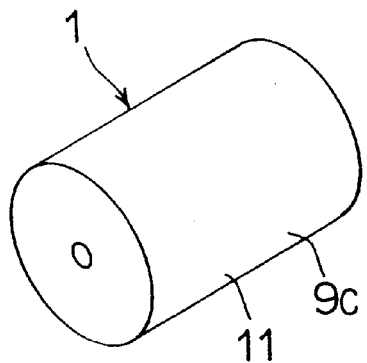
Figure 28:
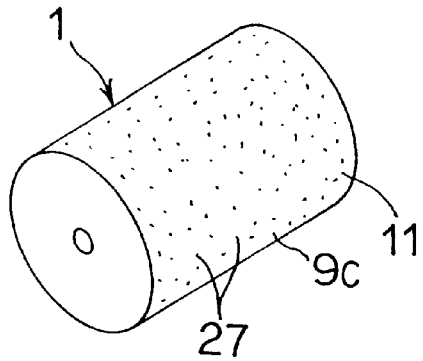
Figure 28:
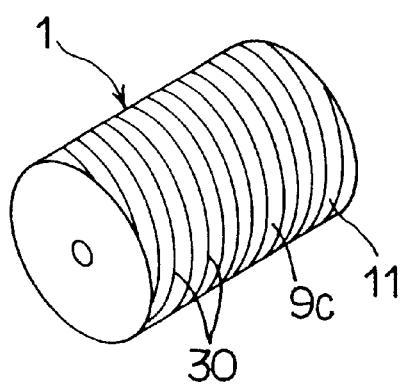
Figure 28:
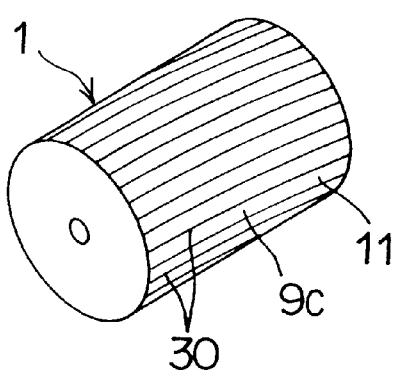
Figure 28:
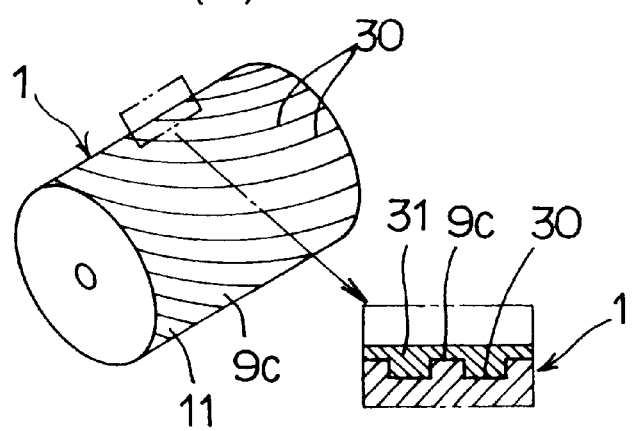

Further, FIGS. 28A to 28E shows an embodiment of a columnar machining electrode 1 which is capable of being used in the above polishing machining device. FIG. 28A shows a machining electrode 1 having a smooth surface 11 used in the above polishing machining device. FIG. 28B shows an example in which a large number of fine irregularities 27 are formed at random on the outer peripheral surface 9c of the machining electrode 1 shown in FIG. 28A, for example, which can be formed by blasting the surface 11 of the machining electrode 1. FIGS. 28C and 28D show cases in which continuous screw-shaped recess grooves 30 or ribs having an inclined angle with respect to the rotating axis are formed on the outer peripheral surface 9c of the machining electrode 1 shown in FIG. 28A. The screw-shaped recess grooves 30 shown in FIG. 28C have a large inclined angle with respect to the rotating axis, and the screw-shaped recess grooves 30 shown en FIG. 28D have a small inclined angle with respect to the rotating axis. In the case of thus forming the screw-shaped recess grooves 30 on the outer peripheral surface 9c, since the catching of gas is facilitated, and plasma is intermittently generated and extinguished, the plasma can be prevented from being shifted to arc discharge, and a region where plasma is generated is scanned along the surface of the workpiece 2, thereby being capable of preventing the workpiece 2 from being excessively heated. FIG. 28E shows a machining electrode 1 where the screw-shaped recess grooves 30 shown in FIG. 28C or 28D are embedded in a corrosion material such as alumina coating, and its surface is made smooth. In the figure, reference numeral 31 denotes an alumina layer. Although this machining electrode 1 has no action of facilitating the catching of gas, it further can enhance the corrosion resistance of the machining electrode 1 and can intermittently generate and extinguish the plasma. Furthermore, the above-mentioned respective means can be combined appropriately for use. Although not shown, similarly to the above example, fine irregularities 27 or screw-shaped recess grooves 30 can be formed on the inner peripheral surface 9d of the cylindrical machining electrode 1.

Figure 29:
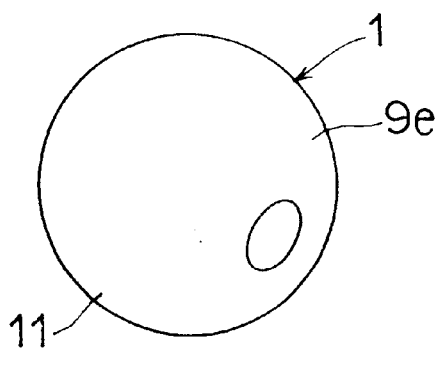
Figure 29:
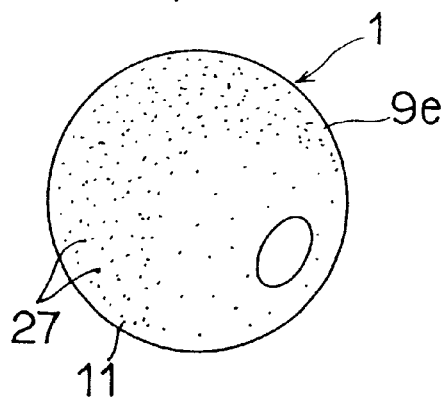
Figure 29:
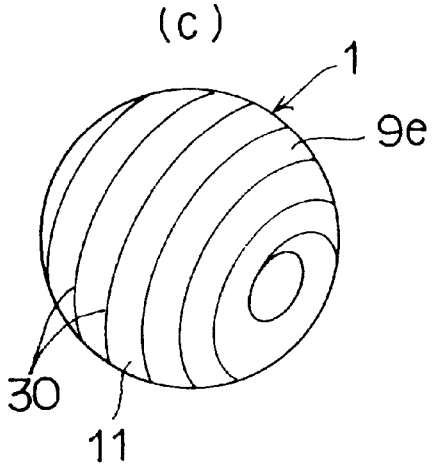
Figure 29:
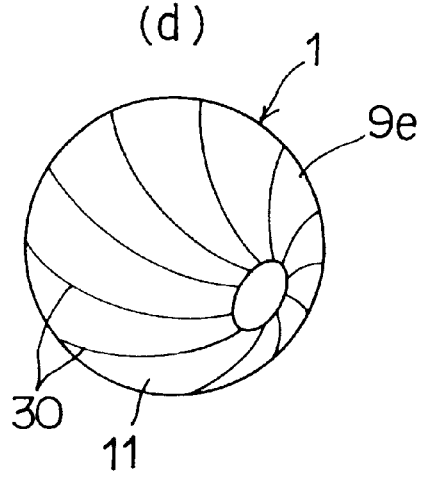
Figure 29:
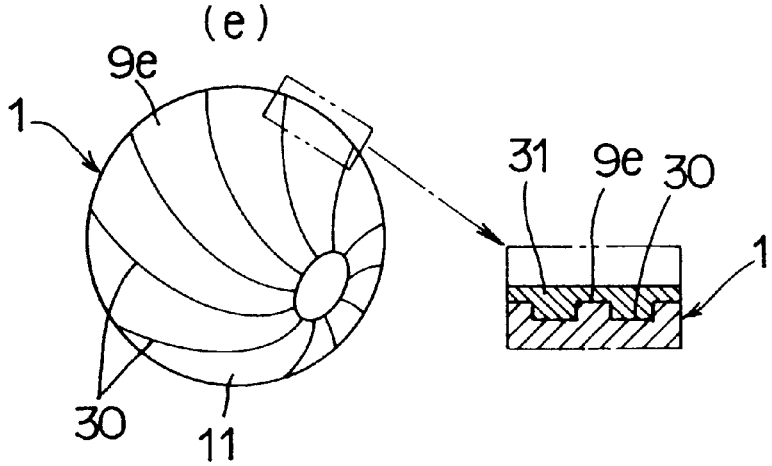

FIGS. 29A to 29E show an embodiment of a spherical machining electrode 1 which is capable of being used in the above-mentioned numerically controlled machining device for an arbitrary shape. FIG. 29A shows a spherical machining electrode 1 having a smooth surface 11. FIG. 29B shows an example in which a large number of fine irregularities 27 are formed at random on the spherical surface of machining electrode 1 (surface 11) of FIG. 29A. FIGS. 29C and 29D show cases in which continuous screw-shaped recess grooves 30 or ribs having an inclined angle with respect to the rotating axis are formed on the spherical surface (surface 11) of the machining electrode 1 shown in FIG. 29A. The screw-shaped recess grooves 30 shown in FIG. 29C have a large inclined angle with respect to the rotating axis, and the screw-shaped recess grooves 30 shown in FIG. 29D have a small inclined angle with respect to the rotating axis. FIG. 29E shows a machining electrode 1 where the screw-shaped recess grooves 30 shown in FIG. 29C or 29D are embedded in an alumina coating 31, and its surface 11 is made smooth. Furthermore, the above-mentioned respective means can be combined appropriately for use.

Figure 30:
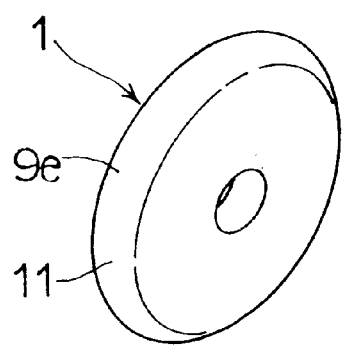
Figure 30:
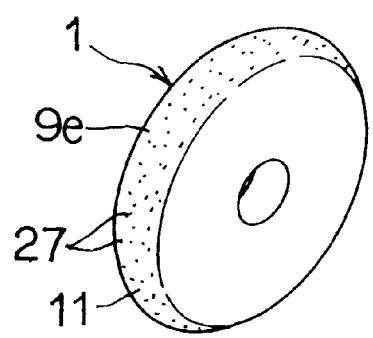
Figure 30:
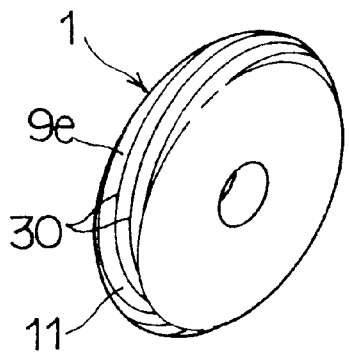
Figure 30:
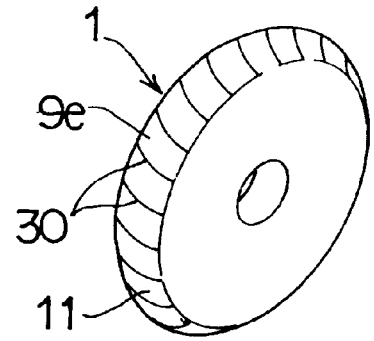
Figure 30:
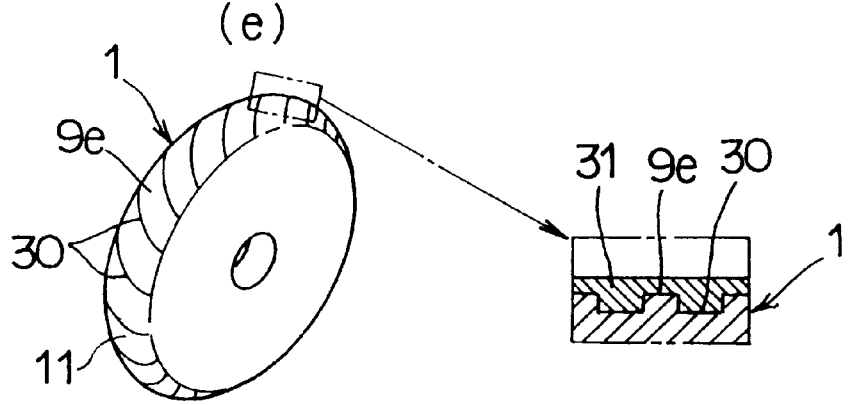

FIGS. 30A to 30E show an embodiment of a thick disc-shaped machining electrode 1 having an arc swelling on the outer peripheral portion 9e which is capable of being used in the above-mentioned numerically controlled machining device for an arbitrary shape. FIG. 30A shows a machining electrode 1 having a smooth circular hole-shaped electric field concentrated portion 9. FIG. 30B shows an example in which a large number of fine irregularities 27 are formed at random on the outer peripheral surface of the machining electrode 1 shown in FIG. 30A. FIGS. 30C and 30D show cases in which continuous screw-shaped recess grooves 30 or ribs having an inclined angle with respect to the rotating axis are formed on the outer peripheral surface of the machining electrode 1 shown in FIG. 30A. The screw-shaped recess grooves 30 shown in FIG. 30C have a large inclined angle with respect to the rotating axis, and the screw-shaped recess grooves 30 shown in FIG. 30D have a small inclined angle with respect to the rotating axis. FIG. 30E shows a machining electrode 1 where the screw-shaped recess grooves 30 shown in FIG. 30C or 30D are embedded in an alumina coating 31, and its surface is made smooth. Also, fine irregularities 27 or spiral recess grooves 28 can be formed on the side surface of the machining electrode 1. Furthermore, the above-mentioned respective means can be combined appropriately for use.

Figure 31:
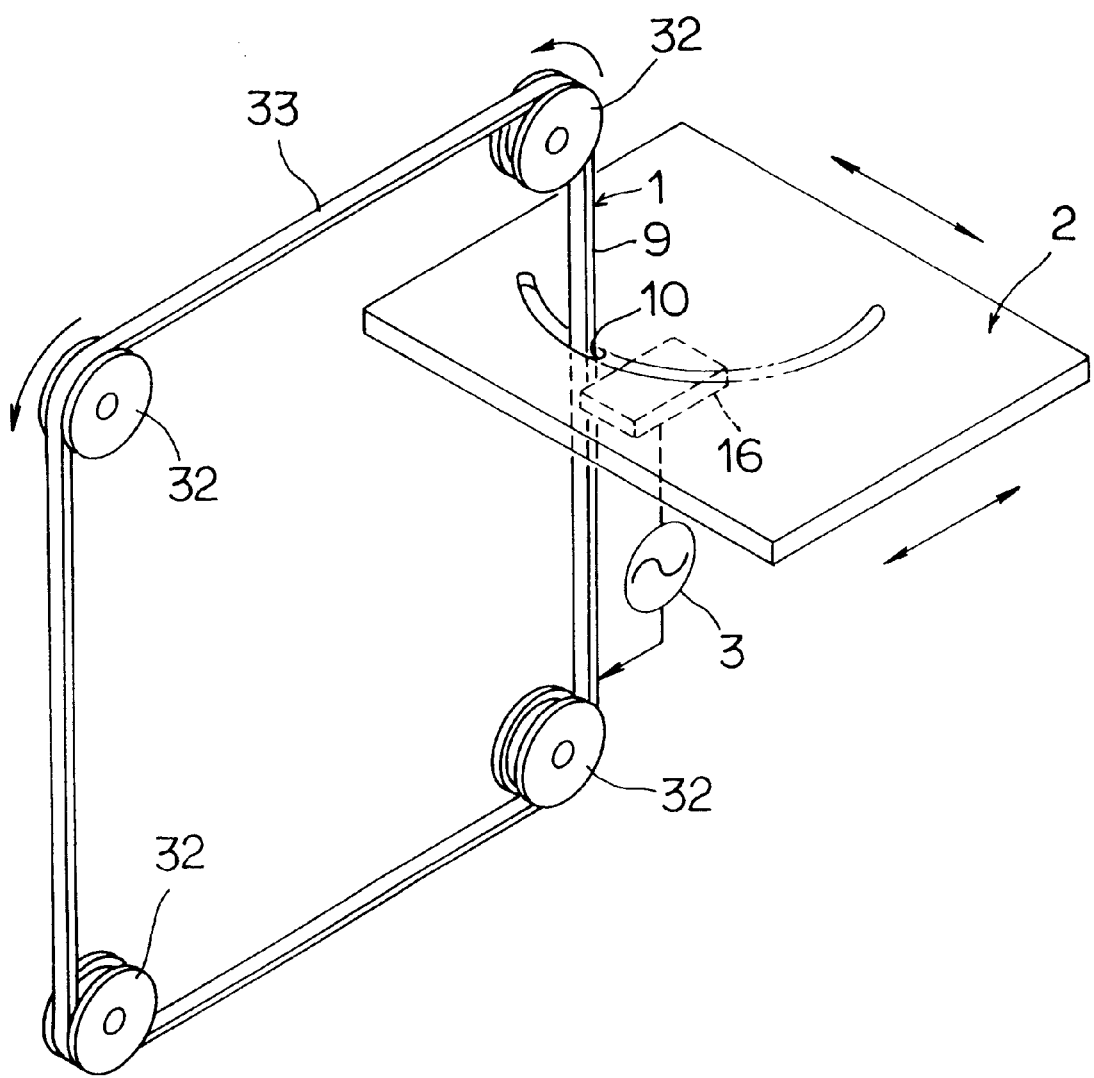
FIG. 31 is a schematically perspective view showing a cutting machining device along an arbitrary curve in accordance with the present invention.

Further, FIG. 31 shows a schematically explanatory diagram of a cutting machining device using an endless machining electrode 1 of a type which is completely different from the above-mentioned machining electrodes 1. The machining electrode 1 of this embodiment is formed of an endless belt or wire, and an endless portion 9 corresponds to a part along its side edge. The machining electrode 1 formed of the belt or wire 33 is put around a plurality of pulleys 32, and any one of the pulleys 32 is coupled with the rotation drive mechanism 6 to enable high-speed rotation. The workpiece 2 can be cut along an arbitrary curve using this machining electrode 1. It should be noted that the auxiliary electrode 16 is disposed on the back side of the workpiece 2 and at a position slightly apart from the endless portion 9 of the machining electrode 1, that is, upstream of the machining progress portion 10.

On the surface of the machining electrode 1 formed of the above belt or wire 33, the above respective means for facilitating the catching of gas can be provided.

In this embodiment, the machining of monocrystal silicon was mainly described. Likewise, other semiconductors as well as insulators such as ceramic and conductors can be subjected to a variety of machining.

The machining electrodes 1 which are rotationally symmetrical as shown in FIGS. 32A and 32B and FIGS. 33A and 33B, that is, the rotating electrodes are proper in polishing machining. FIG. 32 shows an example in which two rotating shafts 15 are fixed to a spherical rotating electrode 1, and FIG. 33 shows an example in which two rotating shafts 15 are fixed coaxially to a columnar rotating electrode 1.

Figure 32:
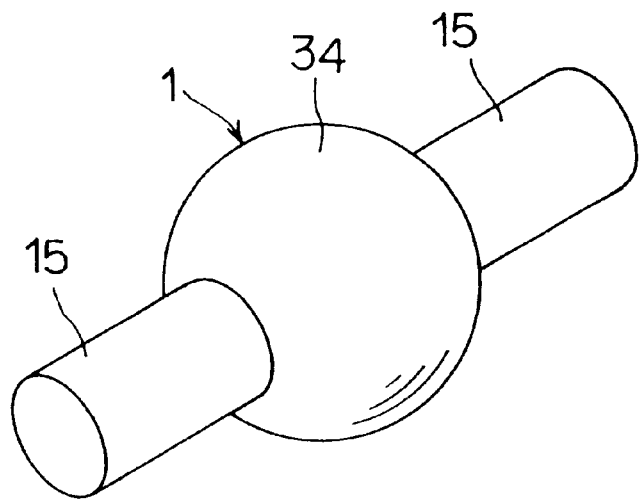
Figure 32:
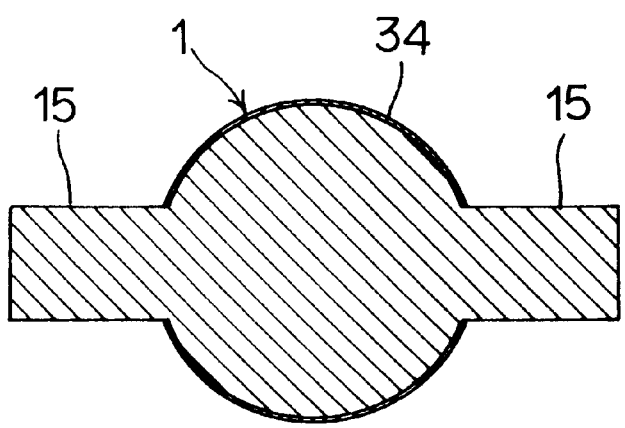
Figure 33:
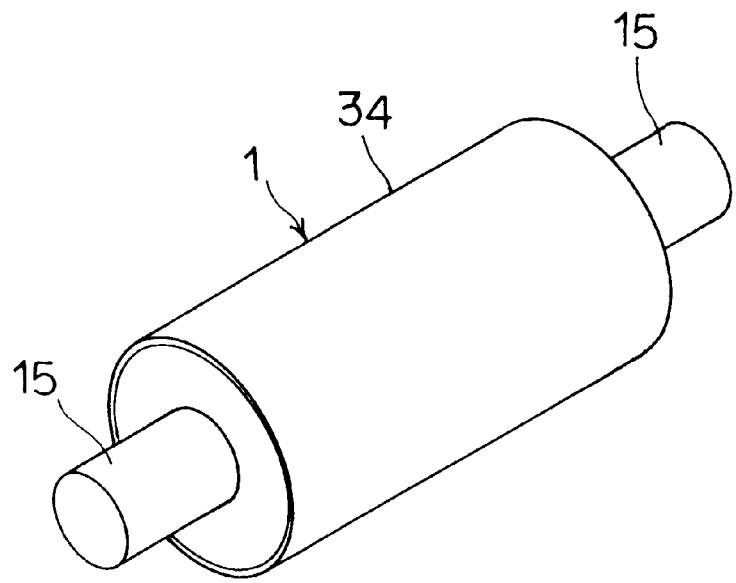
Figure 33:
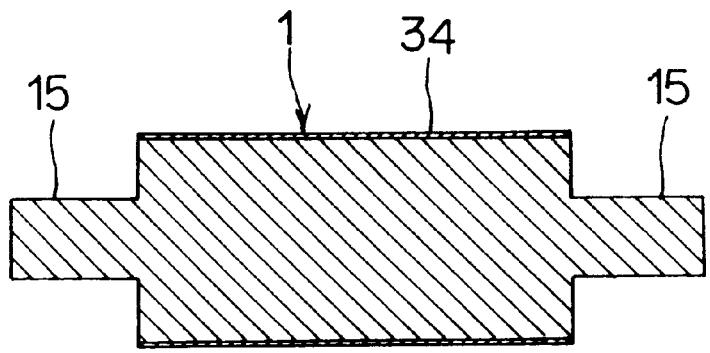

In the spherical rotating electrode 1 shown in FIG. 32, an insulator film 34 having a material which is excellent in the corrosion to neutral radicals (mainly halogen radicals) and small in dielectric loss in a high frequency is formed on its spherical surface (refer to FIG. 32B). Also, in the columnar rotating electrode 1 shown in FIG. 33, the same insulator coat 34 as that in the above example is formed on its columnar surface (refer to FIG. 33B). In this example, it is sufficient that the insulator coat 34 is formed on a part of the surface of the rotating electrode 1, which corresponds to a plasma generation region, but in this embodiment, it is formed on the entire surface thereof.

It should be noted that the plasma generation region corresponds to the outer peripheral portion 9a which forms an electric field concentrated portion. The insulator coat 34 may be formed so as to embed the recess portion on the surface of the rotating electrode 1 therein.

The kinds of the insulator coat 34 may be ceramics such as ziruconia ($ZrO_2$) other than the above-mentioned alumina ($Al_2O_3$), or fluoride such as $AlF_3$, $MgF_2$, $CaF_2$, $NiF_2$, or tetrafluoro ethylene resin coat, since there are many cases in which fluorine gas is used as the reactive gas. In this example, the ceramic coat is accurately formed on the surface of the rotating electrode 1 by flame spraying. Moreover, in the case where the material of the rotating electrode 1 is aluminum, it is preferable that an alumina coat is coated on the surface layer portion of the rotating electrode 1 by alumite processing.

As was described above, in the high-speed machining method due to the high-density radical reaction and the device for performing the method according to the present invention, with the machining electrode being rotated at a high speed, the atmospheric gas is caught by the surface of the machining electrode to form a gas flow which is transverse to the machining gap, with the result that the density of the neutral radicals in the machining gap becomes extremely high, thereby being capable of remarkably increasing the machining rate. Simultaneously, the exhaust of the volatile material produced by the radical reaction is facilitated, thereby being capable of always supplying a fresh reactive gas. Further, with the machining electrode being rotated at a high speed, since the endless portion is moved at a high speed while maintaining the machining gap with respect to the machining progress portion, the concentration of the high-frequency power supplied to the machining electrode is not limited to one portion but always moved. In addition, since the machining electrode is cooled, the limit value of the making power is made high, thereby being capable of increasing the high-frequency power supplied to the machining electrode to enhance the efficiency of producing the neutral radicals. In this way, with an increase in the density of the neutral radicals in the machining gap due to the synergism of an increase in supply of the atmospheric gas in the machining gap by rotating the machining electrode at a high speed and an increase in the making power, the machining rate can be remarkably improved (10 to 100 times) in comparison with the conventional method.

Further, since the machining electrode is rotationally symmetrical with respect to the rotating axis, the machining electrode can be stably rotated about the rotating axis at a high speed, with the results that a gas is caught by the surface of the machining electrode to increase the action for supplying the gas to the machining gap, thus contributing to an increase in the machining rate, and the rotation of the machining electrode is stabilized, thus leading to an excellent flatness of the machined surface.

With the formation of the fine irregularities or grooves on the surface of the machining electrode, the viscous resistance of the boundary layer between the surface of the machining electrode and a gas is increased with the results that the catching of the gas by the machining electrode is facilitated, thereby being capable of efficiently generating a gas flow which is transverse to the machining gap, and supplying a sufficient amount of reactive gas and inactive gas which form a neutral radical source to a desired space.

Also, with the formation of the irregularities and grooves on the surface of the machining electrode that forms the machining gap, an electric field is concentrated on the top portions of the convex portions formed at given intervals to generate plasma, and the machining electrode is rotated at a high speed, thereby being capable of intermittently generating and extinguishing plasma. As a result, the plasma can be prevented from being shifted to arc discharge.

Further, with the formation of the continuous screw-shaped recess grooves or ribs having an inclined angle with respect to the rotating axis on the surface of the machining electrode, the catching of a gas is facilitated, and the plasma can be prevented from being shifted to arc discharge. In addition, since the machining progress portion of the workpiece is scanned in the axial direction, that is, the plasma is intermittently generated and extinguished viewed from one point of the machining progress portion, the machining progress portion can be prevented from being excessively heated.

Further, the auxiliary electrode is disposed on the back surface or the side surface of the workpiece so as to face with the machining electrode with the machining progress portion of the workpiece interposed between the machining electrode and the auxiliary electrode, and a high-frequency voltage is applied between the machining electrode and the auxiliary electrode, thereby being capable of concentrating and generating plasma in only a region of the machining gap even though the workpiece is made of an insulator or a semiconductor. As a result, the density of the neutral radicals can be increased in this region, thus contributing to an increase in machining rate.

Further, in the rotating electrode used in the high-efficiency machining method due to the high-density radical reaction according to the present invention, with the formation of the insulator coat on the surface of the rotating electrode, secondary electrons can be prevented from being emitted from the surface of the electrode, thereby being capable of stably maintaining electrically neutral and low-temperature plasma. Thus, the stabilization of the machining characteristics can be realized. As a result, with the synergism of the above effects and cooling effect obtained by the high-speed rotation of the rotating electrode, the limit value of the high-frequency power which can be made to plasma can be remarkably increased, and an increase in the machining rate can be realized. Also, since alumina or the like having excellent corrosion resistance to the neutral radicals is used as the material of the insulator coat, thereby being capable of realizing an improvement in the durability of the rotating electrode and the prevention of contamination of the surface of the workpiece due to the material of the electrode.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of performing high-efficiency machining by high-density radical reaction using a rotating electrode, in which an endless machining electrode and a workpiece are disposed in a gas atmosphere wherein an inactive gas is mixed with a reactive gas selected in accordance with a material of the workpiece, the machining electrode is rotated at a high speed while maintaining a machining gap between said machining electrode and the machining progress portion of the workpiece, to move the surface of said machining electrode with respect to the machining progress portion at a high speed and to catch the gas by the surface of the machining electrode, thereby forming a gas flow which is transverse to said machining gap, and a high-frequency voltage is applied to the machining electrode to generate plasma in the machining gap, neutral radicals are generated on the basis of the reactive gas, a volatile material produced by the radical reaction of said neutral radicals with atoms or molecules which constitute the machining progress portion of the workpiece is gasified and removed, and the machining electrode and the workpiece are moved relatively to progress machining.

2. A method of performing high-efficiency machining by high-density radical reaction using a rotating electrode as claimed in claim 1, wherein said machining electrode is rotationally symmetrical with respect to a rotating axis, and said machining electrode is rotated about the rotating axis at a high speed to catch the gas by the surface of the machining electrode and to supply the gas to the machining gap.

3. A method of performing high-efficiency machining by high-density radical reaction using a rotating electrode as claimed in claim 1 or 2, wherein fine irregularities or grooves are formed on the surface of said machining electrode to facilitate the catching of the gas.

4. A method of performing high-efficiency machining by high-density radical reaction using a rotating electrode as claimed in claim 1 or 2, wherein an auxiliary electrode is disposed on the back surface or the side surface of the workpiece so as to face with said machining electrode in such a manner that the machining progress portion of said workpiece is interposed between said machining electrode and said auxiliary electrode, and a high-frequency voltage is applied between said machining electrode and said auxiliary electrode.

5. A high-efficiency machining device due to high-density radical reaction using a rotating electrode, comprising:
   a chamber inside of which the endless machining electrode and the workpiece are disposed, for sealingly enclosing or circulating an atmospheric gas wherein an inactive gas is mixed with a reactive gas selected in accordance with a material of the workpiece;
   a high-frequency power supply for supplying a high-frequency power to a machining electrode;
   a matching device for matching said high-frequency power with an impedance of a load;
   a feed drive mechanism for maintaining a machining gap between said endless machining electrode and the machining progress portion of the workpiece and for relatively moving the machining electrode and the workpiece;
   a rotation drive mechanism for rotating said machining electrode at a high speed to form a gas flow which is transverse to said machining gap by moving said machining electrode with respect to the machining progress portion at a high speed and by catching the gas by the surface of the machining electrode;
   wherein a high-frequency voltage is applied to the machining electrode to generate plasma in the machining gap, neutral radicals are generated on the basis of the reactive gas, a volatile material generated by the radical reaction of said neutral radicals with atoms or molecules which constitute the machining progress portion of the workpiece is gasified and removed, and the machining electrode and the workpiece are moved relatively to progress machining.

6. A high-efficiency machining device due to high-density radical reaction using a rotating electrode as claimed in claim 5, wherein said machining electrode is rotationally symmetrical with respect to a rotating axis, and said machining electrode is rotated about the rotating axis at a high speed to catch the gas by the surface of the machining electrode and to supply the gas to the machining gap.

7. A high-efficiency machining device due to high-density radical reaction using a rotating electrode as claimed in claim 5 or 6, further comprising an auxiliary electrode which is disposed on the back surface or the side surface of the workpiece so as to face with said machining electrode in such a manner that the machining progress portion of said workpiece is interposed between said machining electrode and said auxiliary electrode, and wherein a high-frequency voltage is applied between said machining electrode and said auxiliary electrode.

8. A high-efficiency machining device due to high-density radical reaction using a rotating electrode as claimed in claim 5 or 6, wherein said machining electrode is shaped in the form of a flat disc, and its outer peripheral portion forms an electric field concentrated portion to cut the workpiece.

9. A high-efficiency machining device due to high-density radical reaction using a rotating electrode as claimed in claim 5 or 6, wherein said machining electrode is in the form of a hollow flat ring, and its inner peripheral portion forms an electric field concentrated portion to cut the workpiece.

10. A high-efficiency machining device due to high-density radical reaction using a rotating electrode as claimed in claim 5 or 6, wherein said machining electrode is in the form of a thick disc, a hollow thick disc, a column or a cylinder, and a bus is provided in parallel with the rotating axis on its outer peripheral surface or its inner peripheral surface, to polish the workpiece.

11. A high-efficiency machining device due to high-density radical reaction using a rotating electrode as claimed in claim 5 or 6, wherein said machining electrode is in the form of a sphere, a thick disc having an arc swelling on its outer peripheral portion, or a flat disc, and its outer peripheral portion forms an electric field concentrated portion, a relative position of the machining electrode and the workpiece is moved under numerical control, and the mean residence time of the electric field concentrated portion with respect to the machining progress portion of the workpiece is determined in length in accordance with the amount of machining at the machining progress portion to machine the workpiece in an arbitrary shape.

12. A high-efficiency machining device due to high-density radical reaction using a rotating electrode as claimed in claim 5 or 6, wherein said machining electrode is in the form of a cylinder or a column from the outer periphery of which a single or a plurality of ring-shaped blades are projected at appropriate intervals, and the outer peripheral portion of the blade forms an electric field concentrated portion to dice a plate-shaped workpiece or to groove the surface of the workpiece.

13. A high-efficiency machining device due to high-density radical reaction using a rotating electrode as claimed in claim 8, wherein on the side surface of said machining electrode which is in the form of the flat disc or the hollow flat ring, fine irregularities, spiral recess grooves, or ribs are formed.

14. A high-efficiency machining device due to high-density radical reaction using a rotating electrode as claimed in claim 8, wherein on the outer peripheral portion or the inner peripheral portion of said machining electrode which is in the form of the flat disc or the hollow flat ring, gear-shaped irregularities are formed at given intervals.

15. A high-efficiency machining device due to high-density radical reaction using a rotating electrode as claimed in claim 10, wherein on the surface of said machining electrode which is in the form of the thick disc, the hollow thick disc, the column or the cylinder, having the bus which is in parallel with the rotating axis on the outer peripheral surface or the inner peripheral surface, fine irregularities, continuous screw-shaped recess grooves or ribs having an inclined angle are formed.

16. A high-efficiency machining device due to high-density radical reaction using a rotating electrode as claimed in claim 11, wherein on the surface of said machining electrode which is in the form of the sphere, the thick disc having the arc swelling on its outer peripheral portion, or the flat disc, fine irregularities, continuous screw-shaped recess grooves or ribs having an inclined angle are formed.

17. A rotating electrode for use in the high-efficiency machining method due to the high-density radical reaction, in which while a machining gap is maintained between a machining electrode and the machining progress portion of a workpiece which are disposed in a gas atmosphere wherein an inactive gas is mixed with a reactive gas selected in accordance with a material of the workpiece, the machining electrode is rotated at a high speed so that the gas is caught by the surface of said rotating electrode, to thereby form the flow of gas which is transverse to said machining gap, a high-frequency voltage is applied to the rotating electrode to generate plasma in the machining gap so that neutral radicals are generated on the basis of the reactive gas, a volatile material generated by the radical reaction of said neutral radical with atoms or molecules which constitute the machining progress portion of the workpiece is gasified and removed, and the machining electrode and the workpiece are moved relatively to progress machining, wherein an insulator coat high in corrosion resistance to the neutral radical is formed on at least a surface of the machining electrode corresponding to the plasma generation region.

18. A rotating electrode for use in the high-efficiency machining method due to the high-density radical reaction as claimed in claim 17, wherein said insulator coat is formed of a ceramics coat.

19. A rotating electrode for use in the high-efficiency machining method due to the high-density radical reaction as claimed in claim 17, wherein said rotating electrode is made of aluminum, and said insulator coat is formed of an alumina coat which is formed through alumite processing.

20. A rotating electrode for use in the high-efficiency machining method due to the high-density radical reaction as claimed in claim 17, wherein said rotating electrode is formed of a tetrafluoro ethylene resin coat.

* * * * *